(12) United States Patent
Gupta et al.

(10) Patent No.: US 7,234,763 B2
(45) Date of Patent: Jun. 26, 2007

(54) INSTRUMENT PANEL ASSEMBLY

(75) Inventors: Vikas Gupta, East Amherst, NY (US); Hein J. Koelman, Eppstein (DE); Steve J. Rogers, Pinckney, MI (US); Eric Kurtycz, Lake Orion, MI (US); Ravi Ramanathan, Midland, MI (US)

(73) Assignee: Dow Global Technologies Inc, Midland, MI (US)

( * ) Notice: Subject to any disclaimer, the term of this patent is extended or adjusted under 35 U.S.C. 154(b) by 0 days.

(21) Appl. No.: 10/974,568

(22) Filed: Oct. 27, 2004

(65) Prior Publication Data
US 2005/0082896 A1 Apr. 21, 2005

Related U.S. Application Data

(63) Continuation of application No. 10/776,087, filed on Feb. 11, 2004, which is a continuation of application No. 10/216,970, filed on Aug. 12, 2002, now Pat. No. 6,739,673.

(60) Provisional application No. 60/312,874, filed on Aug. 15, 2001, provisional application No. 60/335,430, filed on Oct. 31, 2001.

(51) Int. Cl.
*B60K 37/02* (2006.01)
*B60H 1/24* (2006.01)

(52) U.S. Cl. .................. 296/208; 296/70; 296/193.02; 296/72

(58) Field of Classification Search .................. 296/70, 296/72, 193.02, 192, 208, 203.02; 180/90; 138/155, 156, 171, 172
See application file for complete search history.

(56) References Cited

U.S. PATENT DOCUMENTS

| | | | |
|---|---|---|---|
| 3,171,691 | A | 3/1965 | Buehrig |
| 4,065,182 | A | 12/1977 | Braniff et al. |
| 4,088,367 | A | 5/1978 | Atkinson et al. |
| 4,142,757 | A | 3/1979 | Fogle, Jr. et al. |
| 4,246,734 | A | 1/1981 | Fogle, Jr. et al. |
| 4,440,434 | A | 4/1984 | Celli |
| 4,478,899 | A | 10/1984 | Mayumi et al. |
| 4,530,541 | A | 7/1985 | Resag et al. |
| 4,595,238 | A | 6/1986 | Goldner |
| 4,711,493 | A | 12/1987 | Schrom et al. |
| 4,986,600 | A | 1/1991 | Leblanc et al. |

(Continued)

FOREIGN PATENT DOCUMENTS

| | | |
|---|---|---|
| DE | 4208150 | 9/1993 |

(Continued)

OTHER PUBLICATIONS

Lorenzo et al., The Dow Chemical Company, Material Selection Guidelines for Structural Instrument Panel Applications, International Congress and Exposition.

(Continued)

*Primary Examiner*—D. Glenn Dayoan
*Assistant Examiner*—Greg Blakenship
(74) *Attorney, Agent, or Firm*—Dobrusin & Thennisch PC

(57) ABSTRACT

An improved seating system that includes a seat back assembly (10) that is fabricated to include a seat back (12) with a first panel portion (14) that is optionally secured to a second panel portion (16) with one or more fasteners such as welds, adhesives, tack-offs, steel brackets or otherwise. The first panel portion (14), the second panel portion (16) or both preferably are plastic. The seat back assembly (10) may include one or more integrated reinforcement structures (20).

21 Claims, 16 Drawing Sheets

U.S. PATENT DOCUMENTS

| | | | |
|---|---|---|---|
| 5,029,942 A | 7/1991 | Rink | |
| 5,106,928 A | 4/1992 | Skoultchi et al. | |
| 5,133,588 A | 7/1992 | Hutchinson et al. | |
| 5,224,756 A | 7/1993 | Dukatz et al. | |
| 5,253,924 A | 10/1993 | Glance | |
| 5,280,995 A | 1/1994 | Elton | |
| 5,282,667 A | 2/1994 | Elton et al. | |
| 5,298,587 A | 3/1994 | Hu et al. | |
| 5,320,875 A | 6/1994 | Hu et al. | |
| 5,354,114 A * | 10/1994 | Kelman et al. | 296/192 |
| 5,358,300 A * | 10/1994 | Gray | 296/192 |
| 5,364,159 A * | 11/1994 | Kelman et al. | 296/192 |
| 5,433,786 A | 7/1995 | Hu et al. | |
| 5,447,327 A | 9/1995 | Jarboe et al. | |
| 5,494,712 A | 2/1996 | Hu et al. | |
| 5,539,070 A | 7/1996 | Zharov et al. | |
| 5,540,479 A | 7/1996 | Thomas et al. | |
| 5,542,698 A | 8/1996 | Ichino et al. | |
| 5,575,533 A | 11/1996 | Glance | |
| 5,597,205 A | 1/1997 | Glance et al. | |
| 5,601,334 A | 2/1997 | Marks | |
| 5,603,550 A | 2/1997 | Holdampf et al. | |
| 5,658,408 A | 8/1997 | Frantz et al. | |
| 5,686,544 A | 11/1997 | Pocius | |
| 5,700,054 A | 12/1997 | Lang | |
| 5,704,685 A | 1/1998 | Handa et al. | |
| 5,713,634 A | 2/1998 | Koike | |
| 5,718,977 A | 2/1998 | Pocius | |
| 5,722,732 A | 3/1998 | Haldenwanger | |
| 5,743,593 A | 4/1998 | Vogt | |
| 5,837,958 A | 11/1998 | Fornsel | |
| 5,846,377 A | 12/1998 | Frantz et al. | |
| 5,855,706 A | 1/1999 | Grewell | |
| 5,863,064 A | 1/1999 | Rheinlander et al. | |
| 5,883,208 A | 3/1999 | Deviny | |
| 5,895,096 A | 4/1999 | Massara | |
| 5,957,498 A | 9/1999 | Tesauro et al. | |
| 5,968,431 A | 10/1999 | Ang et al. | |
| 5,984,419 A | 11/1999 | Partington et al. | |
| 6,027,171 A | 2/2000 | Partington et al. | |
| 6,071,591 A | 6/2000 | Dausch | |
| 6,129,406 A | 10/2000 | Dauvergne | |
| 6,168,239 B1 | 1/2001 | Conner et al. | |
| 6,237,956 B1 | 5/2001 | Truman et al. | |
| 6,250,680 B1 | 6/2001 | Moker | |
| 6,305,733 B1 * | 10/2001 | Rahmstorf et al. | 296/70 |
| 6,315,347 B1 | 11/2001 | Gotz | |
| 6,328,386 B1 | 12/2001 | Good | |
| 6,354,623 B1 * | 3/2002 | Delmastro | 280/732 |
| 6,354,655 B1 | 3/2002 | Kuhns | |
| 6,412,761 B1 | 7/2002 | Baudendistel et al. | |
| 6,422,633 B2 | 7/2002 | Neuss et al. | |
| 6,450,533 B1 | 9/2002 | Kimura et al. | |
| 6,491,346 B1 | 12/2002 | Gupta et al. | |
| 6,497,432 B2 | 12/2002 | Scheib et al. | |
| 6,502,888 B2 | 1/2003 | Inoue et al. | |
| 6,502,897 B2 | 1/2003 | Neuss et al. | |
| 6,536,802 B1 | 3/2003 | Sutherland et al. | |
| 6,552,929 B1 | 4/2003 | Parker | |
| 6,557,929 B2 | 5/2003 | Fox et al. | |
| 6,601,902 B1 | 8/2003 | Rahmstorf et al. | |
| 6,644,722 B2 | 11/2003 | Cooper | |
| 6,648,402 B2 | 11/2003 | Scheib et al. | |
| 6,676,202 B2 | 1/2004 | Brancheriau | |
| 6,679,558 B2 | 1/2004 | Adams et al. | |
| 6,688,680 B1 | 2/2004 | Cooper et al. | |
| 6,705,672 B2 | 3/2004 | Shikata et al. | |
| 6,715,954 B2 | 4/2004 | Mainka et al. | |
| 6,733,064 B2 | 5/2004 | Fox et al. | |
| 6,806,330 B1 | 10/2004 | Sonnenschein et al. | |
| 2001/0024035 A1 | 9/2001 | Schieb et al. | |
| 2001/0043835 A1 | 11/2001 | Mainka et al. | |
| 2002/0003354 A1 | 1/2002 | Inoue et al. | |
| 2002/0024236 A1 | 2/2002 | Schieb et al. | |
| 2002/0058764 A1 | 5/2002 | Sonnenschein et al. | |
| 2002/0074782 A1 | 6/2002 | Saito | |
| 2002/0144808 A1 | 10/2002 | Jones | |
| 2002/0145309 A1 | 10/2002 | Shikata et al. | |
| 2002/0148427 A1 | 10/2002 | Jones et al. | |
| 2002/0153741 A1 | 10/2002 | Speelman | |
| 2003/0001410 A1 | 1/2003 | Cate et al. | |
| 2003/0020202 A1 | 1/2003 | Shigeno et al. | |
| 2003/0090035 A1 | 5/2003 | Mori et al. | |
| 2004/0108744 A1 | 6/2004 | Scheib et al. | |

FOREIGN PATENT DOCUMENTS

| | | |
|---|---|---|
| DE | 196 26 441 A | 1/1998 |
| DE | 196 441 A | 1/1998 |
| DE | 197 28 052 A1 | 1/1999 |
| EP | 0 515 287 A | 11/1992 |
| EP | 1 350 711 A1 | 10/2003 |
| FR | 2420424 | 10/1979 |
| FR | 2 834 270 | 7/2003 |
| FR | 2 834 271 | 7/2003 |
| GB | 1 447 384 A | 8/1976 |
| JP | 409150754 | 6/1997 |
| WO | WO 99/52703 | 12/1999 |
| WO | WO 00/03899 | 1/2000 |
| WO | WO 01/44311 | 6/2001 |
| WO | WO 01/92051 | 12/2001 |
| WO | WO 03/078187 | 9/2003 |
| WO | WO 2004/074026 | 9/2004 |
| WO | WO 2004/074026 A2 | 9/2004 |

OTHER PUBLICATIONS

Giba et al., The Dow Chemical Company, Cockpit Module Approach to Instrument Panels—A System Evolution, International Congress and Exposition, Detroit, Michigan, Feb. 24-27, 1997.

Evans et al., The Dow Chemical Company, Engineering Development and Performance of the Chrysler Dakota Fully-Integrated Thermoplastic Instrument Panel, International Congress and Exposition, Detroit, Michigan, Feb. 26-29, 1996.

Juan et al., The Dow Chemical Company, Evolution of Instrument Panels Made of Polypropylene, International Congress and Exposition, Detroit, Michigan, Feb. 23-26, 1998.

Spuria, The Dow Chemical Company, Welability of PC/ABS Resins in Structural IP Applications, International Congress and Exposition, Detroit, Michigan, Feb. 26-29, 1996.

Giba et al., The Dow Chemical Company, Blow Molded Knee Bolsters: An Alternative Approach, International Congress and Exposion, Detroit, Michigan, Feb. 24-27, 1997.

Lorenzo et al, The Dow Chemical Company, Instrument Panel Design Architectures-Relation to Structure, Materials and Process, International Congress & Exposition, Detroit, Michigan, Feb. 24-27, 1997.

Wiegand et al., General Motors Corporation, Fully Integrated Structural Instrument Panel System, International Congress and Exposition, Detroit, Michigan, Feb. 28-Mar. 3, 1994.

Chapman et al., The Dow Chemical Company, Design Advantages and Benefits of the Chrysler Dakota Fully Integrated Thermoplastic Instrument Panel, International and Exposition, Detroit, Michigan, Feb. 26-29, 1996.

Search Report dated Oct. 23, 2002.

Search Report dated Oct. 29, 2001.

Co-pending U.S. Appl. No. 09/766,792, filed Jan. 22, 2001.

Co-pending U.S. Appl. No. 09/466,321, filed Dec. 17, 1999 (Dow Ref. No. 60043).

"The Scene", GE Plastics, Issue 9, Summer 2000.

Nuss, Rudolf; and Litjens, Frank, "Design and Development of a New Rear Seat Back Made From Glass Mat Thermoplastic Materials," GE Plastics, p. 1-2.

English Abstract of DE 19728052, filed Jan. 7, 1999, BASF AG.

Copending U.S. Appl. No. 09/466,321, filed Dec. 17, 1999.

Copending U.S. Appl. No. 60/447,117, filed Feb. 13, 2003.
Copending U.S. Appl. No. 10/403,603, filed Mar. 31, 2003.
Woodman et al., General Electric Company, Instrument Panel Assembly and MEthods of Manufacture.
International Search Report dated Jan. 19, 2005. PCT/US04/003857.

Search Report and Written Opinion dated Dec. 3, 2004. PCT/US2004/017394.
Search Report and Written Opinion dated Sep. 7, 2004. PCT/US2004/008838.

* cited by examiner

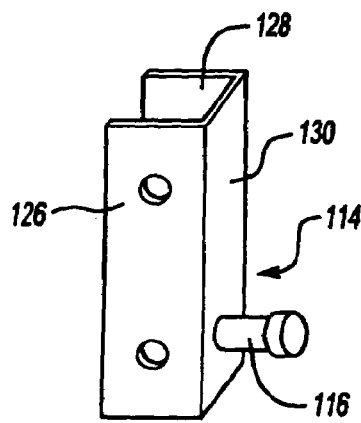
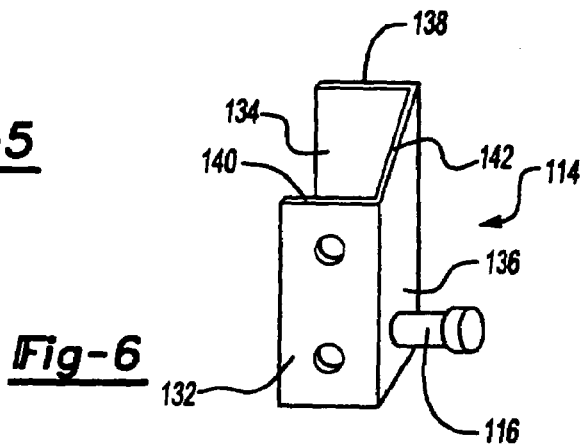
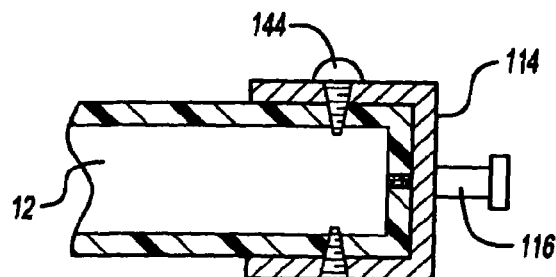
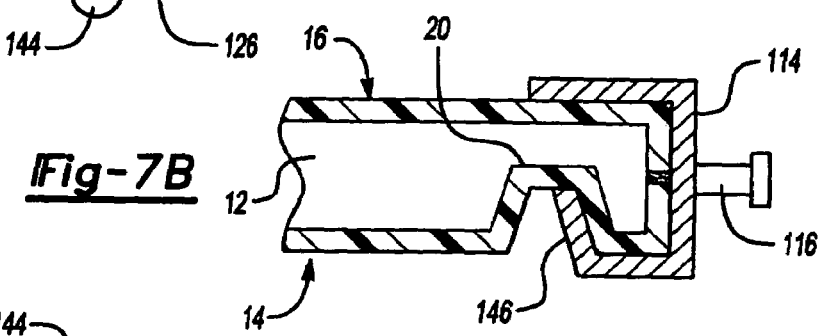
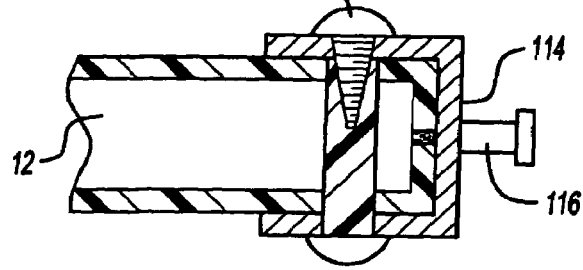
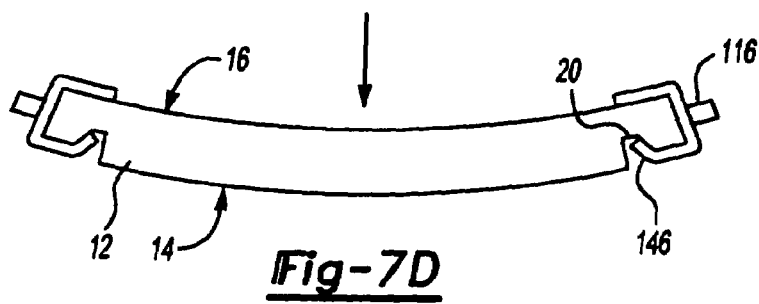

INSTRUMENT PANEL ASSEMBLY

CLAIM OF BENEFIT OF FILING DATE

The present application claims the benefit of the filing date of U.S. Provisional Application Ser. No. 60/312,874, filed Aug. 15, 2001, and 60/335,430, filed Oct. 31, 2001 the contents of which are hereby incorporated by reference.

TECHNICAL FIELD

The present invention relates to an improved seating system, and more particularly to an improved system for automotive vehicle seating. The present invention also relates to improved automotive vehicle interior systems.

BACKGROUND

There is an ever-growing need for improved seating systems in automotive vehicles. The surge in popularity of hatchbacks, sport utility vehicles and minivans, has posed unique design challenges, in view of the need for seating to be adjustable and in many instances to restrain cargo carried toward the rear of the vehicle. In light of the increased consumer usage of these vehicles for stowage and transport of cargo along with passengers (particularly passengers in rear seats), manufacturers have turned their attention to improving the ability of the seating systems to withstand large loads.

One approach has been to develop improved systems for transmitting loads to the seat tracks of vehicle seating assemblies. A growing number of applications, however, employ attachment of seating components directly to the vehicle body in white for load distribution to the body in white. For the improved seat track technology to be viable in the latter applications, it would require substantial modification, which is believed would unduly complicate the manufacturing procedures, require the development of expensive new processing techniques, or add substantial weight to the vehicles. Accordingly, there is a need for an improved, readily manufactured seating system that is capable of meeting vehicle manufacturer design criteria and government standards for vehicles, and which can be efficiently and conveniently adapted for use in a variety of applications including those involving seat track load distribution, body in white load distribution or both.

In addition to having load bearing characteristics, it may be desirable for seating systems to include one or more additional functional features, ordinarily packaged elsewhere (e.g., in other locations of a vehicle). Examples of such features include ducts, vents, motors, electronic devices, entertainment devices, communications devices, other comfort, convenience or utilitarian features and the like. Accommodation of these features in conventional seats often poses difficulties given the limited packaging space available. Thus, there is also a need for a seating system that can integrate one or more comfort, convenience or other utilitarian features.

Examples of advantageous improved systems for seating are disclosed in commonly-owned and co-pending U.S. application Ser. Nos. 09/766,792 (filed Jan. 22, 2001), and 60/312,874 (filed Aug. 15, 2001), and 60/335,430 (filed Oct. 31, 2001), the teachings of which are hereby expressly incorporated by reference herein for all purposes.

SUMMARY OF THE INVENTION

The needs in the art are met by the automotive vehicle seating system of the present invention, which includes a plastic seat back having a first panel portion and an opposing second panel portion, optionally made separately from the first panel portion, and secured (e.g, with attachments such as welds, adhesives, mechanical joints, fasteners, tack-offs or the like) to the the first panel portion. In a preferred embodiment, one or both of the first and second panels portions include one or more integrated reinforcement structures for providing strength to the seat back when assembled. Optionally, the invention also includes an assembly for receiving the seat back and securing it to the vehicle body in white. Advantageously, the seating system displays no fragmentation upon rapid acceleration up to about 20 to about 30 g, with at least a 36 kg mass placed behind the seat back. The system is easy to manufacture and will not add substantial weight to the vehicle as compared with other commercial seating systems.

DESCRIPTION OF THE DRAWINGS

FIG. 5 is a perspective view of one preferred hinge structure;

FIG. 6 is a perspective view of another preferred hinge structure;

FIGS. 7A-7D illustrate examples of alternative hinge configurations;

DETAILED DESCRIPTION OF THE PREFERRED EMBODIMENT

Figure 1:
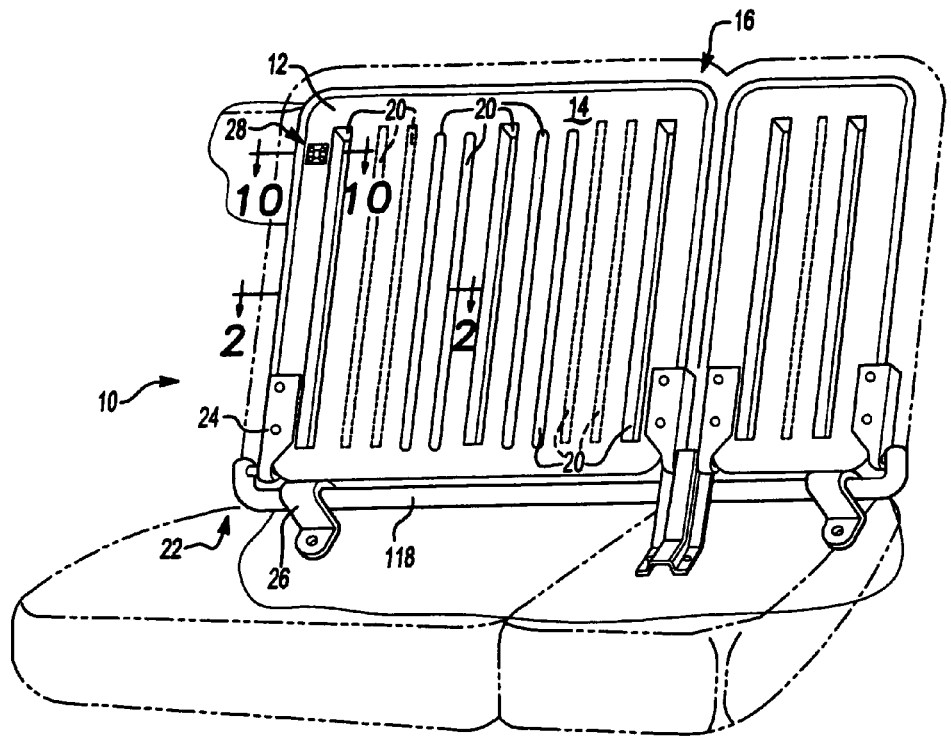
FIG. 1 is a perspective view of a seatback assembly.
Figure 2:
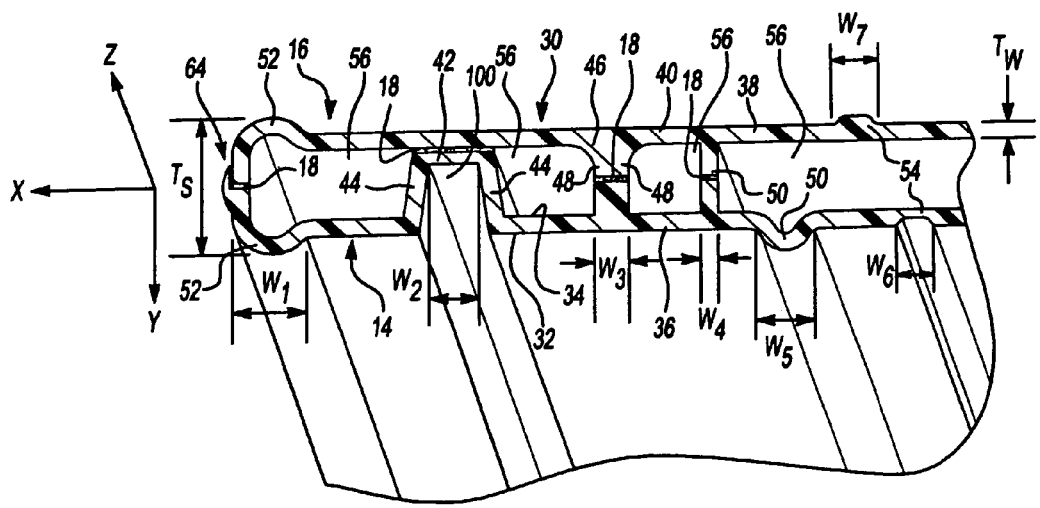
FIG. 2 illustrates a sectional view of the seatback in FIG. 1.

Referring to FIGS. 1 and 2, the present invention is premised upon the development of an improved seating assembly 10 having a plastic seat back 12 including a first panel portion 14 secured to and opposing a second panel portion 16. In one particularly preferred embodiment (although not necessarily in all embodiments) of the present invention, the first panel portion 14 is manufactured separately from the second panel portion 16 and the two are joined together. In another embodiment, the seat back is molded (e.g., blow-molded) to integrally incorporate the first panel portion and the second panel portion 16. Additional panel portions may also be included, and may be fabricated differently from or integrally with either or both of the first or second panel portions. The panel portions may be made of any suitable material, including but not limited to metal, plastic (including reinforced or unreinforced plastic), other composite material or otherwise. Preferably, at least one of the panel portions is plastic. More preferably, the first and the second panel portions are plastic. In a particularly preferred embodiment, all panel portions are plastic.

The employment of microcellular foam plastics is also contemplated within the scope of the present invention. In accordance therewith, a gas/polymer solution is formed, and the solution is rendered thermodynamically unstable in order to nucleate microvoids. The growth of nuclei is then controlled as desired.

It is possible to make one or more of the portions using art-disclosed techniques for the fabrication of the material selected. Thus, for example, one or more of the portions may be formed, molded, machined or otherwise configured to the desired shape. Where the portions are plastic, it is possible to use any suitable plastic fabrication technique including, without limitation, injection molding (including but not limited to external or internal gas injection molding), blow molding, compression molding, rotational molding, thermoforming, extruding, vacuum forming, foaming-in-place, or otherwise. Accordingly, as can be appreciated, in one embodiment, hybrid seat assemblies can be fabricated, thereby taking advantage of the benefits of different respective materials and different respective fabrication techniques, and also advantageously permitting for the ability to design additional features or otherwise package components into any space between the panel portions. In one embodiment, the first panel portion is a first material, and the second panel portion is a second material that is different from the first material. In another embodiment, the material is the same in both portions. In both of the above, the fabrication technique for each of the panel portions may be the same or different. By way of illustration, in one particularly preferred embodiment, the entire seat back is formed by blow molding. In another embodiment, an injection molded portion will be joined with another portion made with the same or a different technique. For example, different hybrid combinations might include:

1) A blow molded portion of a first material joined with an injection molded portion of a second material;

2) A blow molded portion of a first material joined with an injection molded portion of the first material;

3) A thermoformed portion of a first material joined with an injection molded portion of a second material;

4) A thermoformed portion of a first material joined with an injection molded portion of the first material;

5) An injection molded portion of a first material joined with a portion that employs the first material but is made from a technique selected from the group consisting of compression molding, thermoforming, extruding, vacuum forming, and foaming-in-place; or 6) An injection molded portion of a first material joined with a portion that employs a second material and is made from a technique selected from the group consisting of compression molding, thermoforming, extruding, vacuum forming, and foaming-in-place.

In yet another preferred embodiment, a first material is injection molded to form the first portion, and a second material (which may be the same as or different from the first material) is injection molded to form the second portion. The first portion and the second portion are then secured to each other.

The first panel portion 14 optionally may be secured to the second panel portion 16 employing one or more joints 18 of any suitable structure; in some embodiments there may be no joint at all. In the embodiment shown, the joints 18 preferably are adhesive joints, however, other suitable attachments (e.g., as a result of a tack-off) may be employed in lieu of or in combination with the adhesive. One preferred adhesive joint will employ an adhesive in contact with the entire opposing joining surfaces of the respective panel portions (e.g., about substantially the entire periphery). However, another joint contemplates intermittent placement of the adhesive for contacting selected portions of the opposing joining surfaces (e.g., intermittently spaced about the periphery). In another embodiment, it may be possible to secure the panel portions together with a combination of attachments. For example, a mechanical interlock or interference joint, friction fit joint, a fastener, or a combination thereof might be employed in addition to or in place of adhesive. Examples of suitable joints which might be employed in accordance with the present invention can be found in commonly owned and copending U.S. application Ser. Nos. 09/825,721 and 09/826,477, hereby expressly incorporated by reference for all purposes. To aid in adhesion of the joints one or more of the work pieces may be suitably surface treated, such as with a suitable primer, a plasma surface treatment or a combination thereof.

An example of one preferred coating is a carbon-silica based plasma deposited coating as described in U.S. Pat. No. 5,298,587; U.S. Pat. No. 5,320,875; U.S. Pat. No. 5,433,786 and U.S. Pat. No. 5,494,712 incorporated herein by reference. Other surface treatments might also be employed such as plasma surface treatment pursuant to art disclosed teachings as found in U.S. Pat. No. 5,837,958, incorporated herein by reference.

The seat back 12 may further include one or more integrated reinforcement structures 20 disposed between the first panel portion 14 and the second panel portion 16. A hinge assembly 22 might be employed for pivotally anchoring the seat back 12 to an automotive vehicle. The hinge assembly 22 includes a receiving portion 24 for securing the seat back to the hinge assembly, and a mounting portion 26 for securing the hinge assembly to the vehicle. A retention mechanism 28 is employed for maintaining the seat back in a generally upright position. The hinge assembly 22, retention mechanism 28 or a combination of the two effectively define an assembly for attaching the seat back 12 to the vehicle and anchoring it to one or more body in white portions of the vehicle. As used herein, and illustrated in FIG. 2, by reference to an exemplar molded section 30, the phrase "wall stock thickness" or "wall thickness" shall refer to the dimension ($T_w$) between a first surface 32 and a second surface 34 of a wall, such as a first wall 36. Moreover, the phrase "part section thickness" or "section thickness" ($T_s$) shall refer to the dimension between the first surface of the first wall 32 and an outwardly disposed surface 38 of a second wall 40, if cut by an intersecting plane. According to preferred embodiments of the present invention, wall thicknesses may vary between about 1 mm and 4 mm, and more preferably between about 2.0 mm and 3.0 mm and section thicknesses may vary between about 10 mm and 100 mm, and more preferably between 20 mm and 35 mm.

The phrase "integrated reinforcement structure" shall refer to a location where, as shown in FIG. 2 (and FIG. 25), the first wall 36 and second wall 40 of a molded component are joined, enlarged or reduced in wall thickness, section thickness, or otherwise configured to effectively create a beamed structural section for creating a locally modified bending moment or otherwise imparting additional rigidity, toughness or impact resistance to a seat back assembly.

By way of further reference to FIG. 2, various different structural configurations are shown, one or more of which can be employed in the design of seat backs for the present invention. It will be appreciated that the ability to separately mold and assemble different panel portions allows for a wide design landscape. For instance, the use of molding processes such as injection molding allows the ability to design in various section profiles, including for instance, variable thickness sections (whether continuously variable, incrementally variable or both).

Further, the present invention contemplates that reinforcing structures, fasteners, hooks, handles, or other utilitarian or ornamental features are insert molding in the plastic portion using art-disclosed insert molding techniques. For instance, a bright (e.g., chromed) bezel, a soft touch surface (e.g., textile or leather, padded or not) or other trim might be insert molded to be exposed on a surface of the portion. An identification badge (e.g., a logo or nameplate) might be insert molded as well. Tie downs, baggage hooks or the like might be molded to be exposed to view. Also, it is possible to include a reinforcement member (e.g., made of steel, magnesium, composite, foam, carbon fibre or otherwise) insert molded or otherwise fabricated or placed within the portion and not exposed to view.

Aspects of the disclosure herein have focused on seat backs that are constructed from plural portions that are joined together. Such aspects of the present invention are not intended to be limited to such structures. Rather, the subject matter herein may also find suitable application when employed in or with a seat back that is made from a blow-molding operation (such as by placement of an insert in the mold prior to molding, by defining tooling for achieving a certain blow molded structure or the like).

One preferred embodiment contemplates that at least one of the portions includes a suitable reinforcing structure that is molded integrally into the portion. Referring again to FIG. 2, one such configuration includes a rib configuration 42, having a plurality of walls 44 (shown optionally in contact with the wall 40 that are spaced apart to effectively define a beam structure. Another illustrative configuration includes a rib structure 46 having continuously sloping curved walls 48. Yet another illustrative configuration includes a single wall rib 50. Still another configuration may include an enlarged rib 52 (i.e. having an enlarged portion on one or more of its sides) or some other like configuration. Another configuration includes a wall portion 54 that has a different wall thickness relative to an adjoining wall portion.

The present invention contemplates the use of the present integrated reinforcement structures for imparting additional rigidity, toughness or impact resistance to a seat back assembly, or otherwise locally modifying the bending moment of a structure.

As indicated previously, preferably, the first panel portion 14 is secured to the second panel portion 16, to define one or more open internal spaces 56 between the panel portions 14, 16. Prior to, or during the time that the panel portions 14, 16 are secured together, one or more components may be packaged within the open spaces 56. Alternatively, the structure of a desired component might be actually molded into one or more of the panel portion, and the component is otherwise adapted to become functional upon installation into a vehicle. As a further alternative, the structure of the walls defining an open space may be such as to define yet another functional component.

Figure 2A:
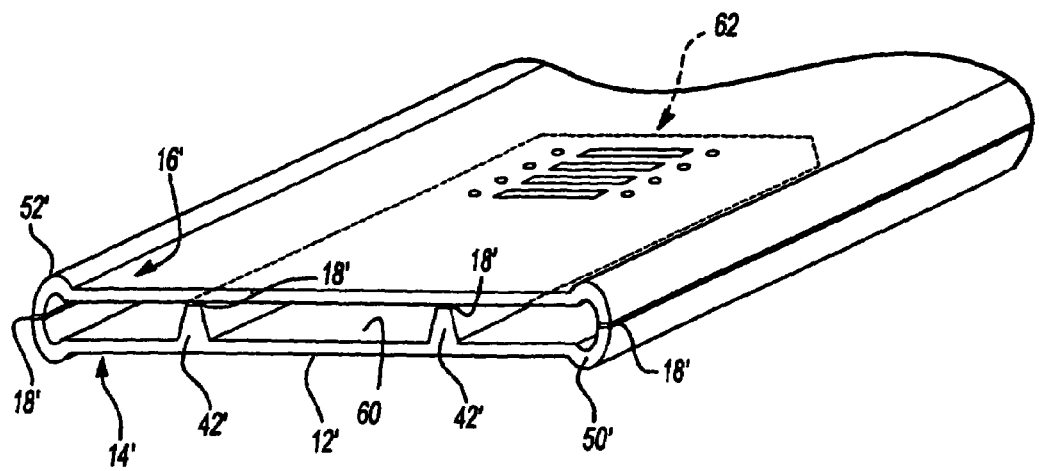
FIG. 2A illustrates a perspective view of an alternative seat back assembly with an integrated ventilation system.

By way of illustration, in one exemplary embodiment, a cross section of which is shown in FIG. 2A, a seat back 12' has a first panel portion 14', a second panel portion 16' and a joint 18'. Ribs 42' define a channel 60 for functioning as a duct and communicating air through a grille, louver, or other suitable vent opening 62 (which may be openable) integrally defined in or otherwise attached to one or both of the portions 14' or 16'. A hose fitting or other suitable attachment (e.g., a male-female attachment, a quick connect attachment or the like), may connect the channel 60 with a source of air, such as a duct routed along the floor, along a vehicle console, through door panels, or a combination.

Though the above discusses integral formation of components, it is also possible that separately fabricated components may be made and assembled into the spaces between panels prior to securing the panels to each other. For example, a motor may be installed. A heating or cooling unit (e.g., a resistive unit, a thermoelectric device or the like) may be installed. A speaker for a sound system may be installed. Entertainment devices may be installed. A communications device may be installed. A global positioning sensor may be installed. Other like components may be installed as well (e.g., transducers, solenoids, sensors, air bag components, lighting, wiring harnesses, pumps, seat belt tensioners, seat belt retractors, seat belt webs, tethers, compass, thermometer, or the like). It is also possible to fill the space with sound deadening materials or other materials for reducing noise or vibration.

Additionally, in one embodiment, one or more of the seat back portions is configured to support, receive or define other components such as a picnic tray, tools (e.g., tire change kits), a tonneau cover, a ski rack, an arm rest, a foot rest, head rest, a recliner, flooring, cosmetic features, cargo nets/restraints, supportive hooks, opening and closing panels, assistive devices for persons with disabilities, adjustable features, papers (e.g., owner's manuals), map pockets, fluid or paper dispensing devices, cup holders, storage containers (e.g., expandable containers or non expandable containers) and the like.

In another embodiment a transparent opening is defined in the seat back. The opening may be hollow or it may be solid (e.g., a transparent plastic, such as polycarbonate, or glass window), for improving the visibility range for the vehicle operator.

Separately fabricated components may be supported within the seat back 12 using any several different techniques. In one example, one or more of the panels 14, 16 of the seat back 12 may be adapted to receive one or more fasteners or other attachments, which can support the modules. In this regard, it may be desirable to mold a boss or insert mold a nut, a stud, a bolt or the like into the panel portion. Alternatively, the first and second panels 14, 16 may be designed to frictionally engage the component, or otherwise nestably receive the component to contain it within one or more of the open spaces 56. In another embodiment the first panel 14, the second panel 16 or both are molded with the component within it. For instance, the component itself (e.g., an encapsulated component, such as an encapsulated electronic device) is an insert for insert molding.

Optionally, one or both of the panel portions 14, 16 may respectively include a flange that extends about at least a portion of its periphery, or some other structure for increasing surface area to which an adhesive may be applied. In FIG. 2, for example, a flange 64 is formed on panel portion 14. As will be appreciated from the discussion further herein, it is also possible to form joints using integrated reinforcement structures, or some other intermediate structure (e.g., a rigid member, a gasket or otherwise).

Figure 2B:
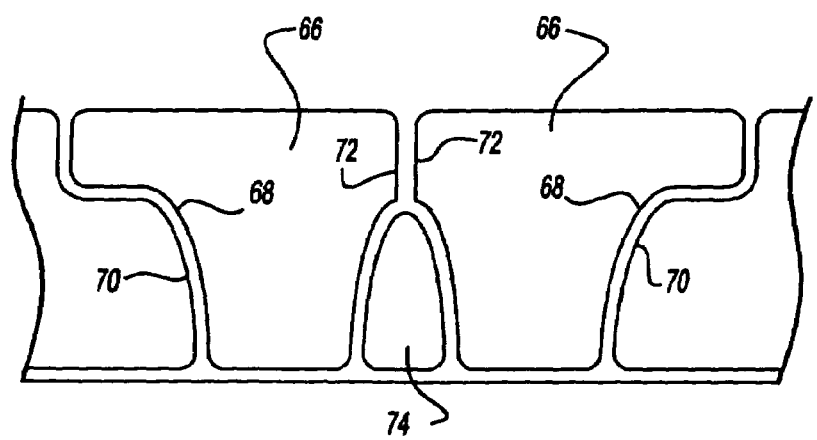
FIG. 2B is a front elevation of one seating configuration of the present invention.

As an added advantage, the different forming techniques and particulary injection molding can allow the panel portions to be designed more easily to include contoured surfaces such that the seat back can be better fit within the vehicle and increase passenger and cargo space within a vehicle. Additionally, the techniques permit for the ability to add shoulder wings for accommodating wheel wells, or central disposed wings to meet above an arm rest or a center pass through door. Referring to FIG. 2B, there is a pair of molded seatbacks 66 formed with opposing panels according to the present invention. As can be seen, each seatback 66 includes a contoured or curved portion 68 that is designed to accommodate wheel wells 70 of the vehicle. FIG. 2B also illustrates central disposed wings 72 such as for accommodating an optional arm rest or center pass through door 74.

Figure 2C:
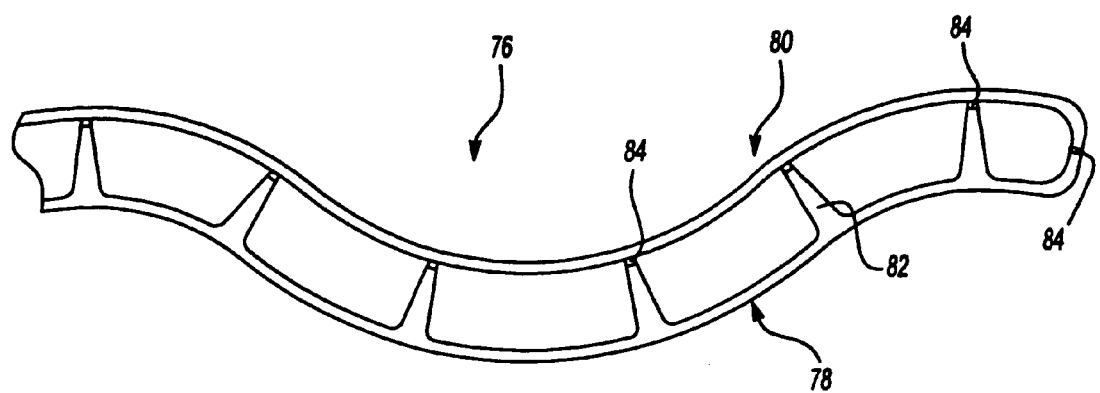
FIG. 2C is a sectional view of another seating configuration of the present invention.

Attractive contours (symmetrical, assymetrical or a combination thereof) can also be molded onto the rearwardly disposed panel portion. Alternatively, the rear panel portion can be molded to include features intended to function when the seat is in a folded position. For instance in FIG. 2C there is shown one such contoured configuration 76 including a forward portion 78, a rearward portion 80, ribs 82 and at least one or a plurality of joints 84 (e.g., an adhesive bonded joint).

It will be appreciated that in either the forward or rearward portion there can also be molded any of a variety of functional features as well, such as guide tracks for receiving additional components, cup holders, work or rest surfaces, or the like.

If employed, the adhesive used to join panel portions 14, 16 may be any suitable adhesive. Preferably it is a urethane based adhesive, and more preferably a urethane adhesive. Alternatively, the adhesive may include a functional component selected from acrylonitrile butadiene styrene (ABS), polycarbonate (PC), or a mixture thereof (e.g. PC-ABS). In a further alternative embodiment the adhesive is a silane adhesive, a silicone adhesive or a mixture thereof. In yet another embodiment, the adhesive is an acrylic adhesive.

The adhesive may be epoxy based. It may include polyolefinics, styrenics, acrylics or mixtures thereof. In yet another embodiment, a preferred adhesive includes alkyl borane. Examples of suitable adhesives are disclosed in commonly owned U.S. Pat. No. 09/466,321 (filed Dec. 17, 1999). Any such adhesive may include suitable performance modifiers including art disclosed tackifiers, elastomers, impact modifiers, or the like.

In addition to or as an alternative to the use of adhesive to join portions, other suitable joining techniques may be used, such as welding. Examples of suitable welding techniques include art-disclosed techniques of ultrasonic welding, linear vibration welding, orbital vibration welding, spin welding, hot plate welding, laser IRAM or combinations thereof. If welding is performed, preferably the plastics of each respective portion to be joined are related, sharing at least one common repeat unit. For instance, it may be possible to weld polycarbonate acrylonitrile butadiene styrene to acrylonitrile butadiene styrene, polycarbonate acrylonitrile butadiene styrene or possibly polycarbonate. Suitable systems for this type of joinder are available commercially from Branson Ultrasonics Corporation. Examples of such systems are also described, without limitation, in U.S. Pat. Nos. 5,855,706; 5,846,377; and 5,658,408, hereby incorporated by reference.

By way of summary, such techniques generally apply relatively high stresses to the parts (optionally supported on an anvil) being joined to induce hysteresis heating at the bond line. One or more resonators, for inducing high frequency vibrations of predetermined frequency are brought into engagement with the workpiece during the weld cycle. Responsive to resonance, energy is transmitted causing softening and flow of the thermoplastic material.

As discussed previously, integrated reinforcement structures may also be formed quite easily using the concepts of the present invention. Turning now in further detail to this aspect, assuming an x-y-z orthogonal coordinate system, the section and wall profiles may vary generally in at least one axis, e.g., in the z direction, to define individual integrated reinforcement structures. The section or wall profile might also vary in either or both of the x direction (i.e. cross car) or y direction (i.e. generally vertical in the seat's upright position) for an individual integrated reinforcement structure. In general the individual integrated reinforcement structures are made up of components that are vertically oriented (i.e. in the y-direction), horizontally oriented (i.e. in the x-direction), of a predetermined geometry, or a combination of some or all of these. A grouping of a plurality of individual integrated reinforcement structures constitutes an "integrated reinforcement structure pattern." A seat back 12 may include one or more patterns 86.

FIG. 3 illustrates examples of various alternative predetermined geometric configurations for individual integrated reinforcement structures 20. FIG. 3 also illustrates examples of various integrated reinforcement structure patterns 86. The individual integrated reinforcement structure 20, the integrated reinforcement structure pattern 86 may include one or a combination of any suitable letter, character, shape, or symbol. Examples of components of such structures or patterns include, without limitation, the "C" shape, "D" shape, "H" shape, "I" shape, "J" shape, "L" shape, "M" shape, "N" shape, "O" shape, "S" shape, "T" shape, "U" shape, "V" shape, "W" shape, "X" shape, "Y" shape, "Z" shape, curves (e.g. sinusoidal curves), zig zags, "+" shape, or the like. Integrated reinforcement structure patterns 86 include a plurality of individual integrated reinforcement structures 20. As seen in FIGS. 3F and 3G, without limitation, the individual integrated reinforcement structure 20 may be a composite of multiple component shapes. The patterns 86 may be random, as seen in FIGS. 3B and 3G, or repetitious, as seen in FIG. 3A or 3E. One or more different type of integrated reinforcement structures 20 of the type illustrated in FIG. 2 may be employed to define each pattern 86 used in a seat back 12.

The reinforcement structures of the seat back 12 may be formed in a variety of manners. Referring to FIG. 2, the reinforcement structures may be formed of two mating or corresponding portions, that are respectively attached to each of the panel portions 14, 16. Thus, when the panel portions 14, 16 are adhered together (which advantageously may be accomplished by contacting a reinforcement structure with adhesive and bonding it to an opposing surface of another panel portion), the corresponding portions meet and are attached with an adhesive joint 18 thereby forming a reinforcement structure such as with reinforcement structures 48 and 50 of FIG. 2. Alternatively, however, a reinforcement structure, such as illustrated by numeral 42 may be formed almost entirely as part of one of the panel portions 14, 16 prior to securing the panel portions 14, 16 together and the thereafter, the reinforcement structure may be joined to the other panel portion 14, 16 with a resulting adhesive joint 18, either about some or all of the periphery of the panel portions, within the space defined between the opposing panel portions, between a reinforcement structure and an opposing panel portion, or otherwise.

In design of the integrated reinforcement structure pattern, the location of the openings is preferably staggered to help reduce or eliminate hinge points. Further, where a plurality of vertically oriented integrated reinforcement structures is used in a pattern, the horizontal spacing ("x" in FIG. 3A) between each individual integrated reinforcement structure will vary from about 5 mm to about 100 mm and more preferably about 20 mm to about 50 mm.

One or more horizontally oriented integrated reinforcement structures might be incorporated in addition to or in lieu of vertical integrated reinforcement structures to help improve cross-car direction stiffness in a seat back. When employed with vertically oriented integrated reinforcement structures, the horizontally oriented integrated reinforcement structures 88 preferably are staggered between vertically oriented integrated reinforcement structures 90 or otherwise located to help reduce the likelihood they will serve as a hinge point. (See, e.g., FIG. 3G). Horizontally oriented integrated reinforcement components 88 structures may be added directly to existing vertically oriented integrated reinforcement structures 90 (see, e.g., FIG. 3G and FIG. 3H). Individual vertically oriented structures 92 may also be employed. The horizontally oriented integrated reinforcement structures alternatively may be incorporated into an overall pattern so that the integrated reinforcement structure is angled or is substantially perpendicular to the horizontal bending diagonal plane.

The design and location of each integrated reinforcement structure 20 and pattern 86 fabricated in the seat back 12 may be optimized for each individual application, taking into account some or all of the following criteria. For each application, the skilled artisan will appreciate that the specific integrated reinforcement structure employed is configured to help minimize the bending or hinge effect caused by loads resulting from rapid deceleration or acceleration of a vehicle in the presence of a passenger or cargo behind a seat (e.g., that which experienced by a top mounted center shoulder belt, top mounted child seat anchors, and luggage intrusion). For instance, in one preferred embodiment, the integrated reinforcement structure and pattern selected generally is one that will position a portion of the integrated reinforcement structure having a higher bending moment in a position generally perpendicular to the torsional bending diagonal plane.

The use of integrated reinforcement structures is further illustrated in the following discussion, by reference to two of the more preferred locations for integrated reinforcement structures, specifically in the perimeter regions of a seat back and in the regions proximate hardware, such as seat belts, seat belt anchors, hinges, latching components or the like.

For a number of applications, it is particularly attractive to incorporate an integrated reinforcement structure around at least a portion of the perimeter 94 of the seat back 12 to help increase horizontal stiffness, vertical stiffness, or both in the perimeter regions of the seat back. With illustrative reference to FIG. 3A, for most applications it is contemplated that an outboard edge 96 of the integrated reinforcement structure 20 is at or within about 50 mm (and more preferably about 15 mm) or less of an edge defining the perimeter 94 of the seat back 12. With further reference to FIG. 2, the width ("w") of any integrated reinforcement structure used in the perimeter regions of a seat back preferably ranges up to about 30 mm, and more preferably it is about 4 to about 20 mm. Such dimension helps to minimize bending in the recessed valley portion 100.

It is also preferable to form an integrated reinforcement structure in the vicinity of any latch strikers or latch members. In some applications, such as where the seat is intended to carry the load for a center belt, or a child seat tether, it may be desirable to modify, further reinforce or eliminate the top perimeter horizontally oriented integrated reinforcement structure to reduce the potential for hinge effect stress concentrator in that vicinity. By reference to FIGS. 4A and 4B (which show illustrative hinge structures), in these applications and others, the bottom end 102 of a vertically oriented perimeter integrated reinforcement structure 104 will be positioned below the highest point 106 of a hinge assembly bracket 108 or other reinforcement 110 (e.g., internally positioned) securing the seat back to the vehicle. More preferably, the overlap ("O") will range from about 25% to as high as about 100% of the vertical length ("$L_H$") of any hinge or reinforcement. Further, the top end 112 of such vertical perimeter integrated reinforcement structure will be spaced from (e.g., within about 10 to about 200 mm of) the top of the seat. Alternatively, a thicker part section thickness as available by the use of structures 52 or 54 of FIGS. 1 and 2, may be incorporated at the top or bottom of the seat back to help increase stiffness.

It should be recognized that the present invention advantageously also permits for insert molding of brackets or other hardware for securing the seat component to the vehicle.

In instances where a center passenger shoulder belt system is employed, or a top child seat tether is employed, optionally, design criteria is employed to help reduce the forward, downward and torsional or diagonal bending of the seat back that are caused by perimeter loads at or adjacent the shoulder belt or tether attachments. Preferably the integrated reinforcement structures will provide good vertical stiffness (as this is the plane that is anticipated to endure the more severe bending forces), as well as good torsional stiffness (responsive to the diagonal offset loads a passenger imparts to a shoulder belt system). In such instances, it is preferable to alternate geometries of the integrated reinforcement structures either in a random or predetermined pattern, or to maintain the integrated reinforcement structure width up to about 40 mm, and more preferably up to about 30 mm (e.g., about 5 to about 30 mm).

The employment of vertically oriented integrated reinforcement structures is particularly preferred in the load path for center belt loads and upper child seat tethers to help avoid vertical bending. Preferably, for these applications, the integrated reinforcement structure width (W) will vary up to about 50 mm and more preferably will be about 4 to about 40 mm, and still more preferably will be about 15 to about 25 mm. The vertically oriented integrated reinforcement structure length ($L_R$) will vary between about 70 to about 95% of the vertical seat back height, and more preferably about 80 to about 90%.

It will be appreciated that the above design criteria are preferred but are not intended as limiting. Depending upon the particular applications, variations to the above may be made. Moreover, it should be appreciated that forming an integrated reinforcement structure need not occur in every application, and the need for and magnitude of such generally will be directly proportional relationship to the size of the seat back. Thus, for example, a smaller folding seat may not require a perimeter integrated reinforcement structure or it may only require it in limited areas.

Referring by way of illustration to FIGS. 1 and 4A-7D (and 24)(without limitation as to the other configurations, such as ones excluding a vertically oriented perimeter integrated reinforcement structure), for folding seat backs, the hinge assembly 22 of the present invention is provided in any suitable manner for assuring that the seat back remains anchored to the vehicle body in white in the event of a sudden or rapid acceleration, deceleration, or a large force is applied.

Though it is possible that locally reinforced structures integral with the seat back may be employed, in one preferred embodiment, it is contemplated that one or more hinge assemblies 22 are secured to the seat back 12 after fabrication of the seat back. The hinge assemblies 22 preferably include relatively tough and high strength to weight materials (such as plain carbon or alloy steels, or a comparable metal, composite or other material), and are configured for facilitating controlled deformation for transmitting loads.

Figure 14:
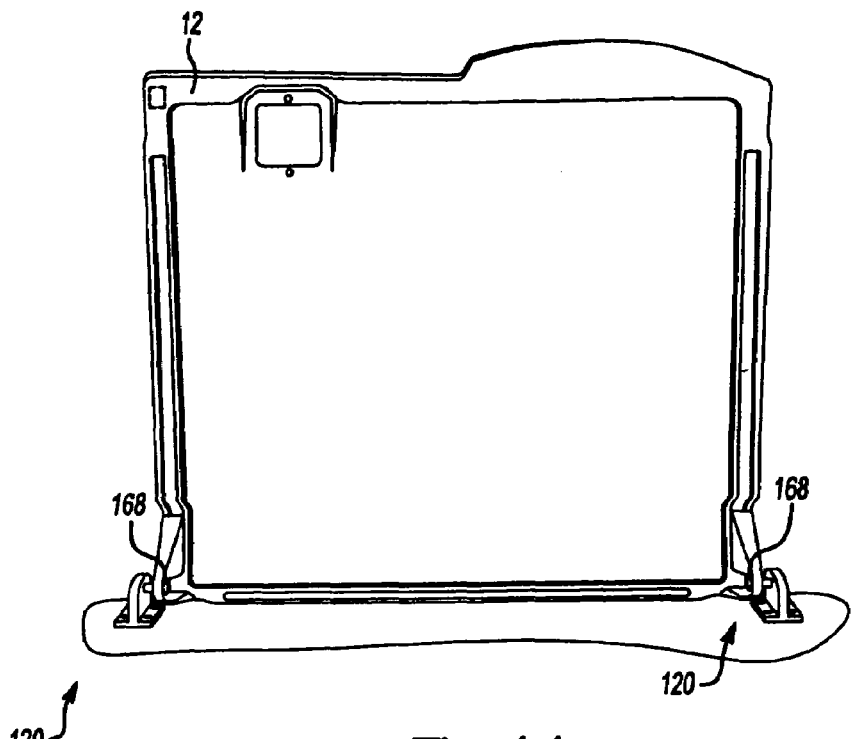
FIG. 14 illustrates an example of an alternate pivotal mounting configuration.
Figure 15:
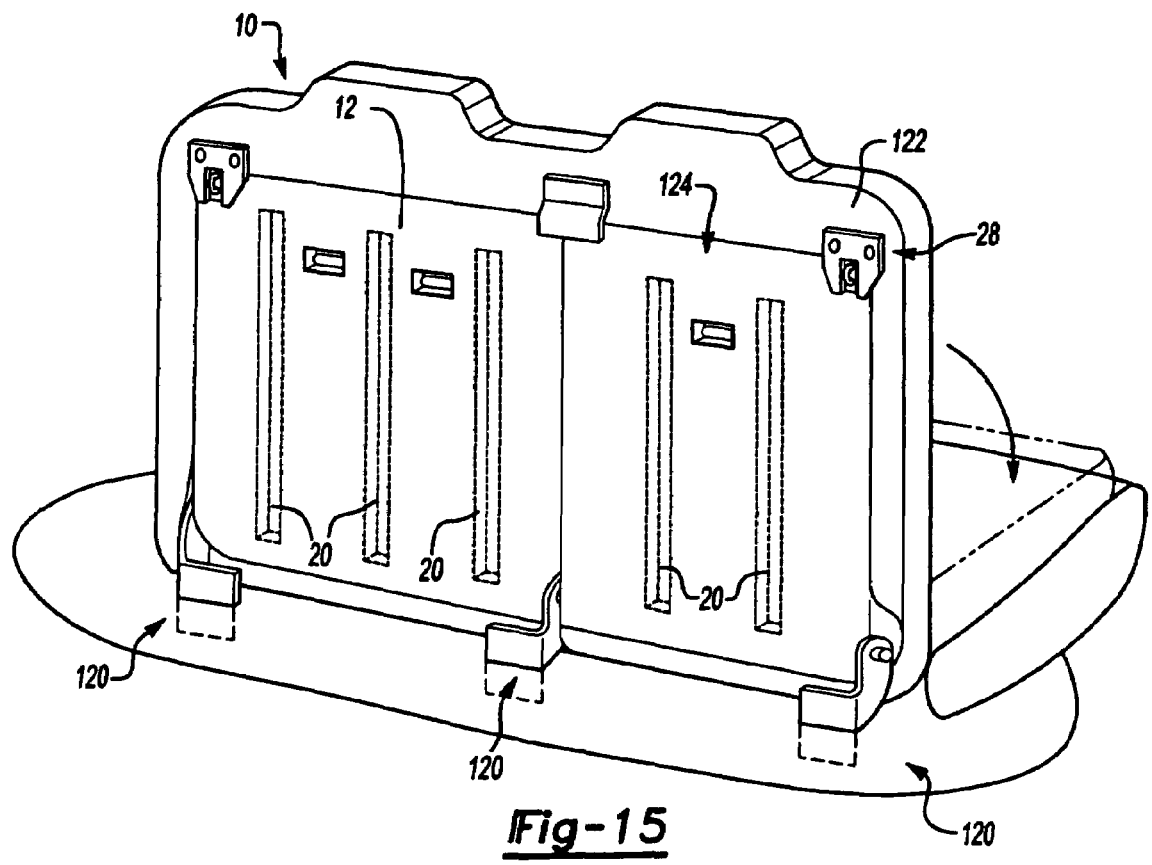
FIG. 15 is a perspective view of an exemplary seatback assembly.
Figure 16:
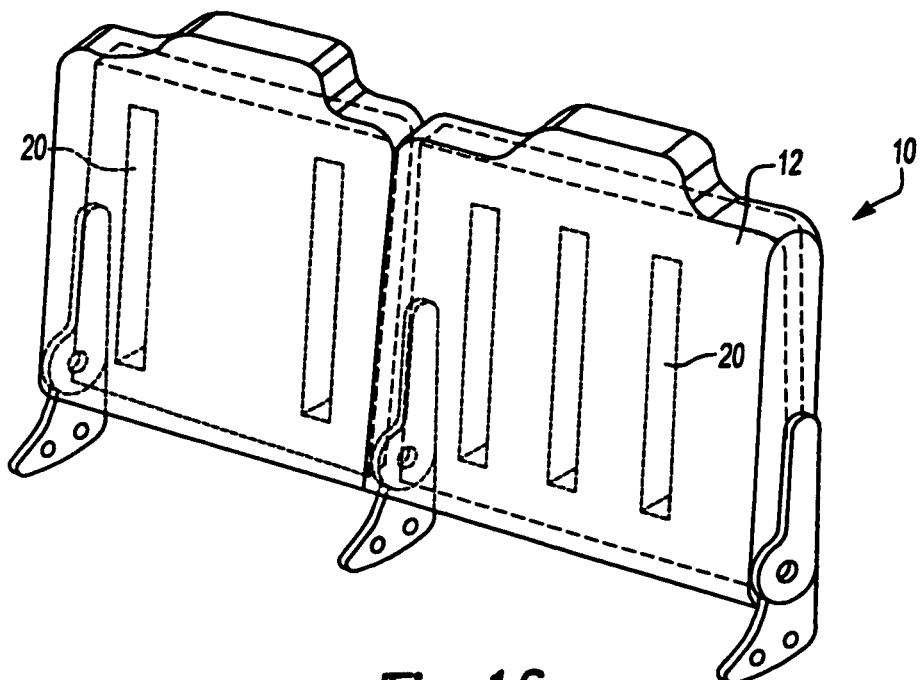
FIG. 16 is a perspective view of another exemplary seatback assembly.
Figure 17:
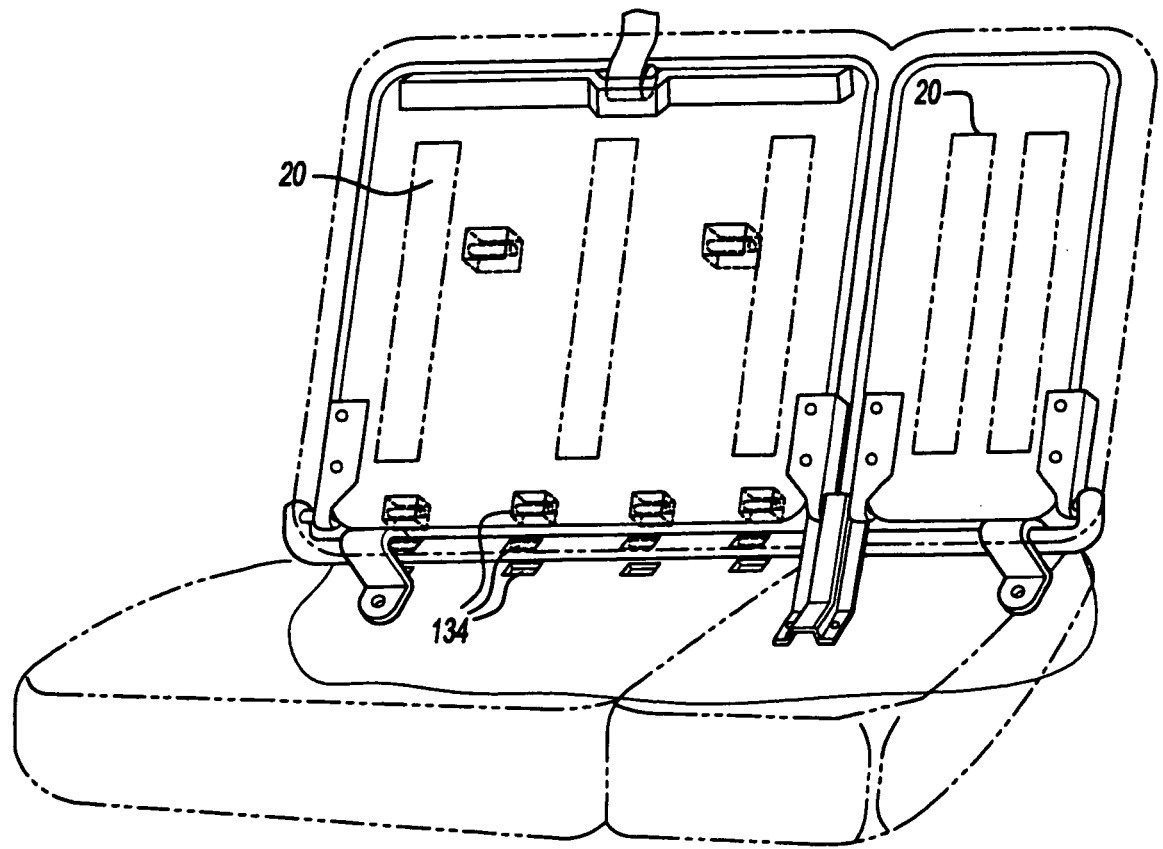
FIG. 17 is a perspective view of a seatback assembly illustrating associated components.

The hinge assembly 22 thus includes a bracket portion 114 adapted for receiving or otherwise engaging the seat back 12, and a suitable pivot portion 116, that can be secured to a vehicle body or other mounting surface, hingedly anchoring the overall seat back assembly 10. In one preferred embodiment, the hinge assembly 22 (and any other anchorage system) is connected to an anchoring substrate, preferably the vehicle body-in-white or an associated structure that has a breaking strength equal to or greater than the breaking strength of the webbing of any seat belt assembly installed as original equipment at that seating position. FIG. 1 illustrates one example of a manner for establishing a pivot attachment, in which a cross bar 118 is mounted to the vehicle body in white and carries the pivot portion and associated bracket portion. In FIG. 14 it can be seen that another alternative is to employ no cross bar, instead having the bracket portion 120 adapted for mounting directly (or with an intermediate structure, such as seat track, pedestal, lower lock/latch, or the like) to the vehicle body in white. In yet another alternative embodiment, as shown in FIG. 15, a frame 122 having a cutout portion 124 is connected to define a seat halo assembly that may be connected to the vehicle body-in-white. The seat backs 12 of FIG. 15 are illustrated with one (e.g., on one side) or more (e.g., on another side) optional child seat tether anchors in the upper central portions. FIGS. 16 and 17 illustrate yet additional optional seat configurations that can be adapted for use in the present invention, in accordance with the teachings herein and those in co-pending U.S. application Ser. No. 09/766,792 (filed Jan. 22, 2001), hereby incorporated by reference.

Figure 4A:
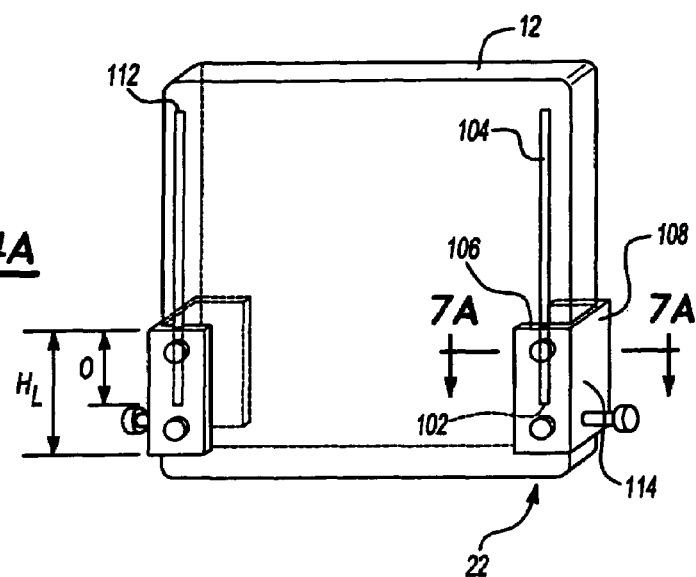
FIGS. 4A and 4B are perspective views of illustrative seatback assemblies.
Figure 4B:
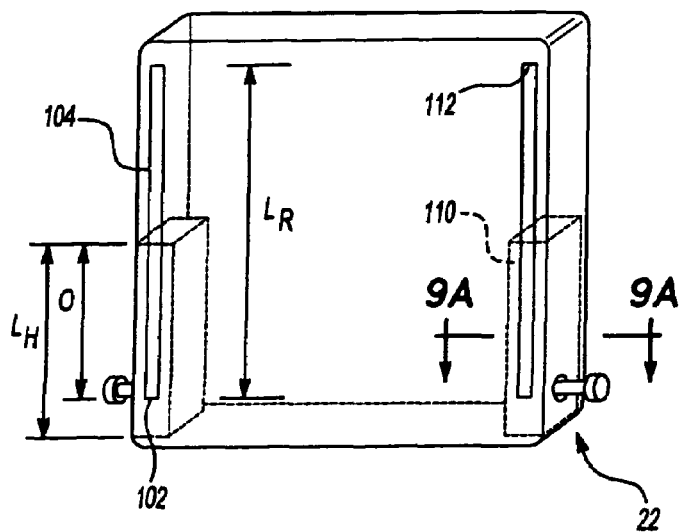
Figure 8A:
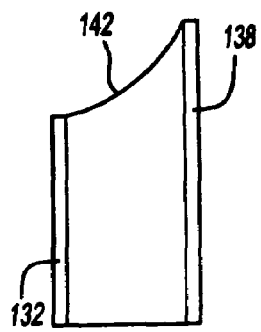
FIGS. 8A-D illustrates examples of alternative hinge bracket configurations.
Figure 8B:
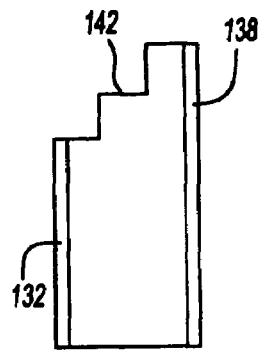
Figure 8C:
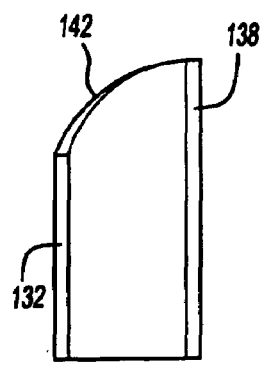
Figure 8D:
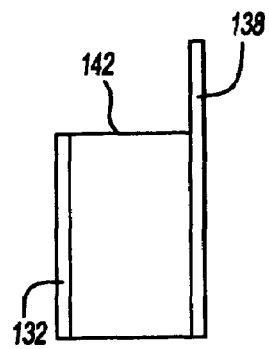
Figure 9A:
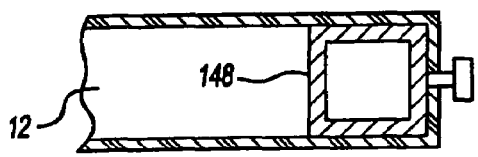
FIGS. 9A-9F illustrate examples of seat back reinforcements.
Figure 9B:
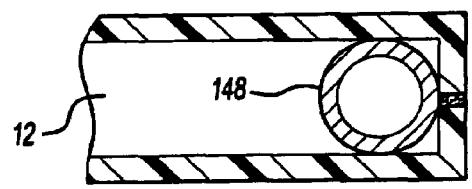
Figure 9C:
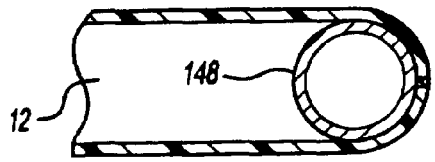
Figure 9D:
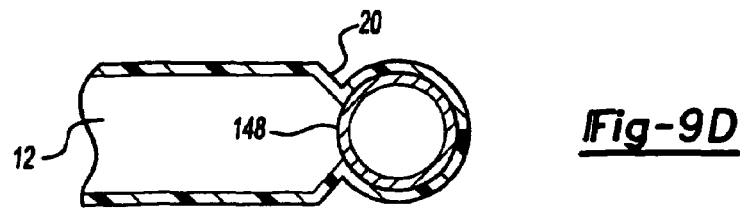
Figure 9E:
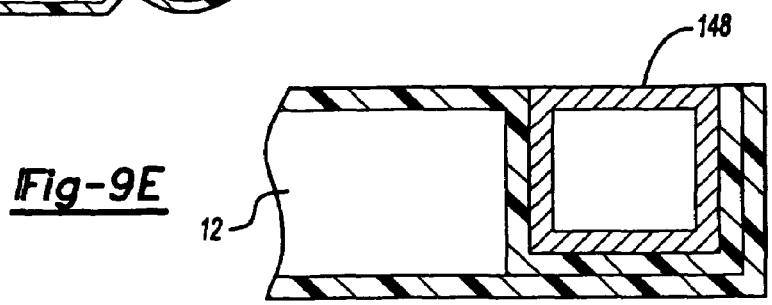
Figure 9F:
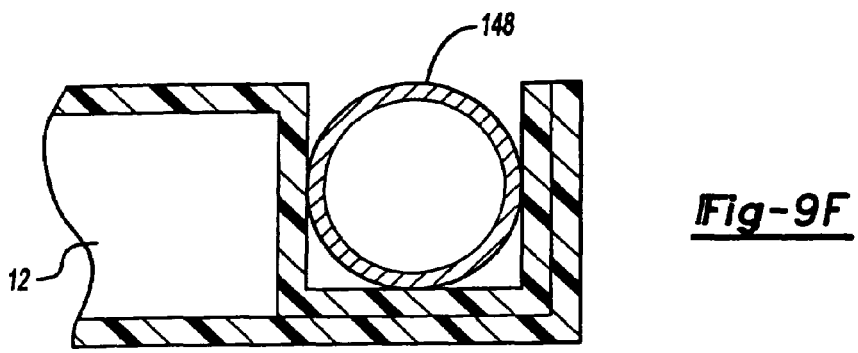

As generally shown in FIGS. 4A and 5-7D, the bracket portion 114 is adapted to receive the seat back in a nesting or mating type relationship, with the bracket portion acting as either or both of a male portion (e.g., if it is structured as a plate reinforcement member 110, or another such insert member as in FIG. 4B) or female portion. As illustrated in FIGS. 4A, 5, 6, for the female portion bracket type includes a plurality of adjoining walls for defining a well or a generally "U-shaped" channel (with or without at least one closed end) for receiving and holding the seat back 12. The average wall thickness of the bracket, assuming a high strength metal such as steel, will range from about 1 to about 3 mm.

In one embodiment, the bracket portion is an elongate member, having a length of about 30 to about 300 mm, and a width of about 10 to about 75 mm. (See, FIG. 5) The well or wells can be disposed anywhere along the length of the hinge assembly (e.g., at one or both of its ends, or at an intermediate location). The walls may be configured in any suitable manner, with FIGS. 5 and 6 illustrating two such configurations. In FIG. 5, the walls include a first side wall portion 126 and a second opposing side wall portion 128, both of which are about the same length, and have an intermediate wall portion 130 bridging them. In FIG. 6, a first side wall portion 132 and a second side wall portion 134 are joined with an intermediate portion 136. The first and second side portions are arranged so that a distal end 138 of the second side wall portion 134 extends beyond a distal end 140 of the first side portion 132. The intermediate side portion 136 is such that it optionally includes a section terminating at an edge 142 that extends beyond the distal end 140 of the first side portion 132 toward the distal end 138 of the second side portion 134. The edge 142 may be any suitable configuration, e.g., linear, curved, stepped or the like, as shown in the illustrations of FIGS. 8A-8D. Further, though FIGS. 9A-9D illustrate a front to rear upward slope of the edge 142, the slope of the edge could be downward.

The hinge assembly is secured to the seat back 12 using any suitable joining technique. It may be mechanically fastened (e.g., by screws or shoulder bolts), adhesively fastened, insert molded, a combination thereof, or otherwise. In a particularly preferred embodiment, as illustrated in FIG. 7A, a fastener 144 is secured through the first wall portion and second wall portion of the seat back and the hinge bracket 114. In FIG. 7C a fastener 144 is fastened to a stud that is formed in the hinge bracket 114 or otherwise placed between the opposing side wall portions.

As shown in FIG. 7B, in another embodiment, one possible bracket includes a side wall portion configured with a projection 146 for cooperating with an integrated reinforcing structure 20 and establishing an interference connection, thereby reinforcing the attachment in response to forward directed longitudinal forces (as illustrated in FIG. 7D). For instance, the bracket may be crimped into, preformed to include a projection that penetrates the volume of, or otherwise grips an integrated reinforcement structure.

Referring to FIGS. 9A-9F, the hinge assembly optionally may be further reinforced by the placement of a supplemental reinforcing insert 148 of suitable geometry (such as triangular, square, polygonal, rounded or otherwise) between or outside of the walls of the seat back, preferably in the vicinity of the bracket. Though it may be a steel (as with a hinge bracket), the reinforcing insert 148 preferably is made of a relatively tough and high strength to weight material, such as titanium, magnesium, aluminum, plastic, plastic composite, carbon fiber or the like. The supplemental reinforcement may be hollow or solid, and it may extend the entire span of the bracket or only a portion of it, or even beyond the bracket. By way of example, for split seats, the typical vertical length of one such reinforcement may range up to about 300 mm, with a cross car width of about 10 to about 75 mm and a fore/aft depth of about 12 to about 37 mm.

It should be appreciated that the use of supplemental reinforcements is not limited to the regions adjacent the hinge assembly, but may be anywhere within the assembly. In this regard, a relatively rigid member, such as a metal (e.g., steel, magnesium, aluminum or the like), composite, unfoamed plastic, or foamed plastic (either prefoamed or foamed in situ) may be incorporated between walls of a seat back wherever localized reinforcement is sought. Without limitation, examples of suitable foams include polyurethanes, epoxies, styrenics, or the like. Softer foams may also be employed for noise and vibration absorption.

Generally, the hinge assembly 22 will result in a portion of the seat back 12 that is susceptible to function as a deformation site or stress concentrator in the event of a sudden or rapid acceleration or deceleration of the vehicle. As seen in FIG. 1, such anticipated deformation site is placed toward the wall that will be forward facing when assembled in the vehicle. For instance, it may be located along the leading edge of the seat back for inducing a compressive load in that region.

As will be appreciated, the brackets described above are particularly advantageously used in foldable seat applications such as found in rear seats of hatchback vehicles sedans or coupes. However, they may also be suitably employed in free standing seating assemblies, in which case they will be mounted to a pedestal or other structure associated with a seat track. They may also be used as front seat backs.

Figure 10:
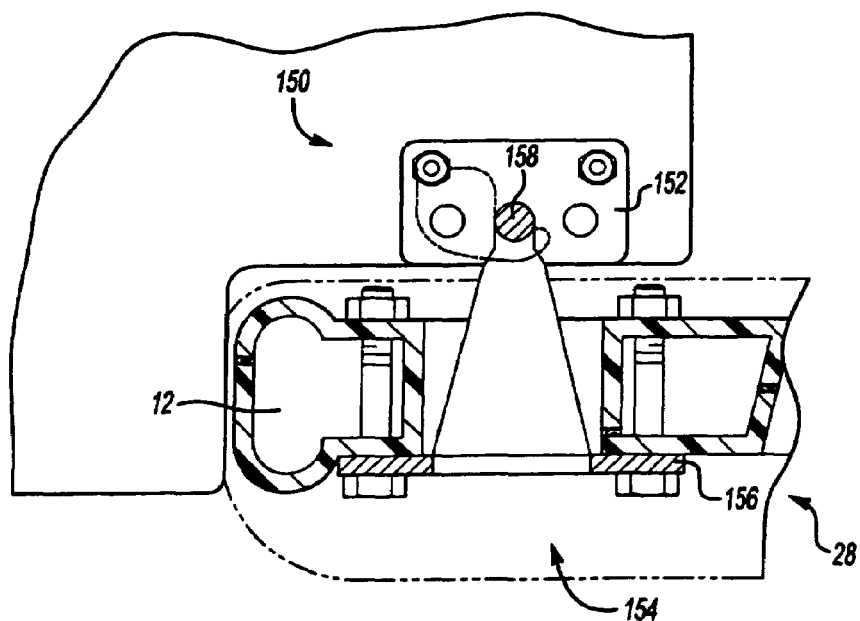
FIG. 10 illustrates a sectional view of a preferred latch assembly.

As discussed elsewhere herein, and referring now also to FIGS. 1 and 10 the present systems may incorporate one or more retention mechanisms 28 (e.g., latch assemblies) at any of a number of different locations on the seat assembly (e.g., along the seat sides, on the seat back, or along the top of the seat back), for affording releasable self locking of the seat back to the vehicle relative to its hinge. It is preferred that any such retention mechanism provide a sufficient combination of high strength and good load distribution over the structure to which it is attached. Preferably, the configuration is such that the seat is maintained in place by the retention mechanism in the event of a sudden or rapid acceleration, deceleration or other force, so that load on the seat back can be transferred as desired within the seat back.

It should be recognized that, though illustrated with reference to a two part seat back, the hinges, retention mechanism and other features disclosed herein may likewise be employed in a blow molded structure, as is taught (for example) in co-pending U.S. application Ser. No. 09/766, 792 (filed Jan. 22, 2001), incorporated by reference.

Retention mechanism configurations may vary application to application. However, once engaged, for a forward-facing seat preferably such mechanism preferably will not release or fail when a forward longitudinal force (Newtons), equal to the product of 9.8 and 20 times the mass of the hinged or folding portion of the seat (kilograms), is applied approximately through the center of gravity of the latched seat portion. Moreover, once engaged, the mechanism preferably also will not release or fail when subjected to an acceleration of about 20 g., in the longitudinal direction opposite to the seat folding direction.

One preferred retention mechanism is a latch assembly 150, as shown in FIG. 10, which includes a conventional latch 152 having a retractable pawl, and a corresponding striker 154. Though illustrated with reference to a striker secured to the seat back, either the striker or the latch may be secured to the seat back, with appropriate configurations to avoid having it pull through the seat back 12.

Figure 11:
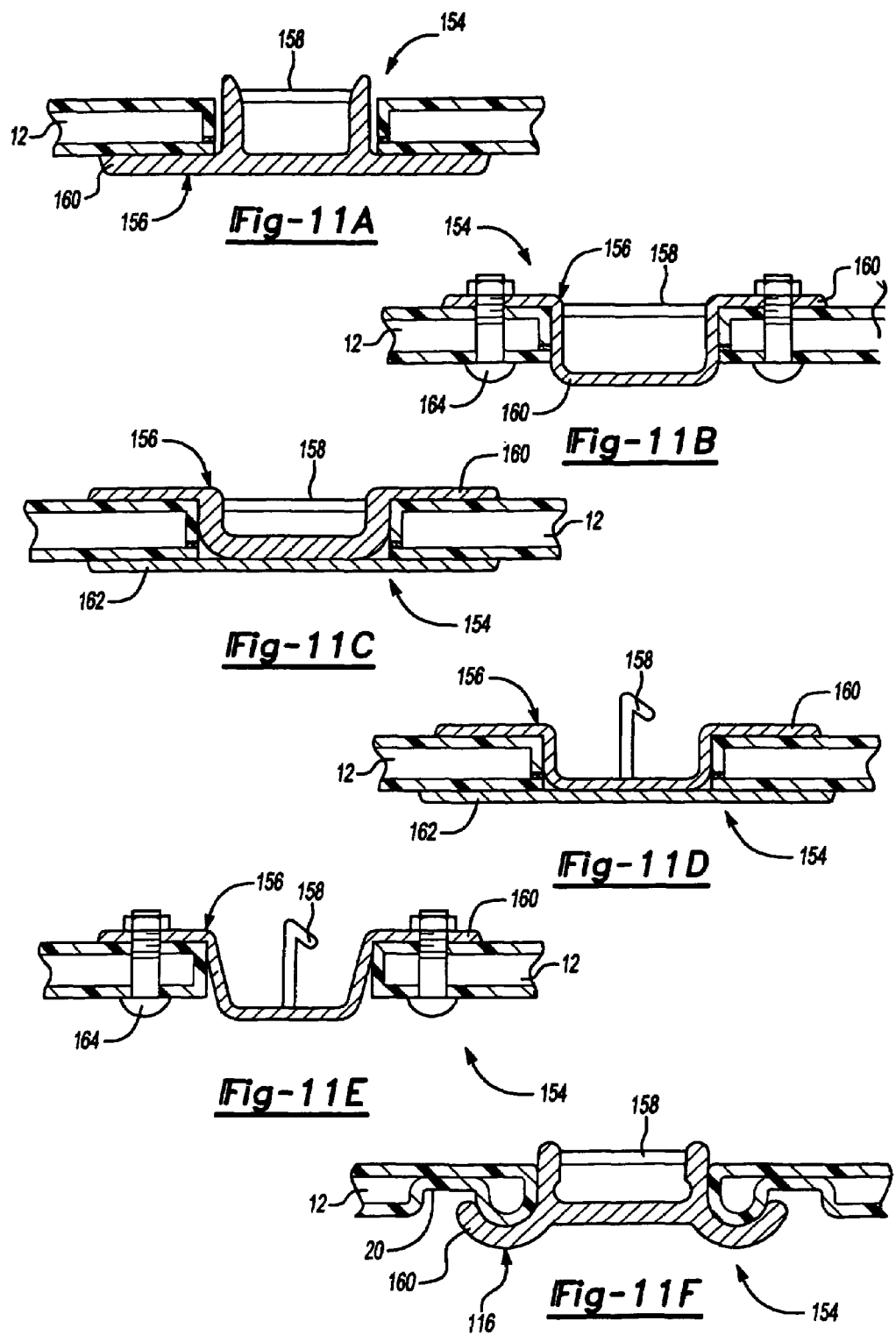
FIGS. 11A-11F illustrate examples of alternative striker assembly configurations.

Illustrative alternative configurations are disclosed in FIGS. 11A-F. In each instance the striker 154 includes at least one mounting portion 156 for attaching to the seat back 12 (either adhesively, with suitable fasteners, insert molded or otherwise) and a projecting striker bar 158 (which projects through an aperature or slot in the seat back 12). The mounting portion 156 includes one or more flanges 160 for overlapping with and engaging the seat back 12 or an integrated reinforcement structure 20 associated with it (e.g. FIG. 11F). The overlap preferably ranges from about 3 mm (and more preferably about 10 mm to about 150 mm). As shown in FIGS. 11C and 11D, in some embodiments a supplemental reinforcing plate 162 or like structure may also be employed.

As illustrated in FIGS. 11B and 11E, without limitation, shoulder bolts 164 or other like structures may optionally be employed as desired for securing the retention mechanism 28 to the seat back 12.

Figure 12:
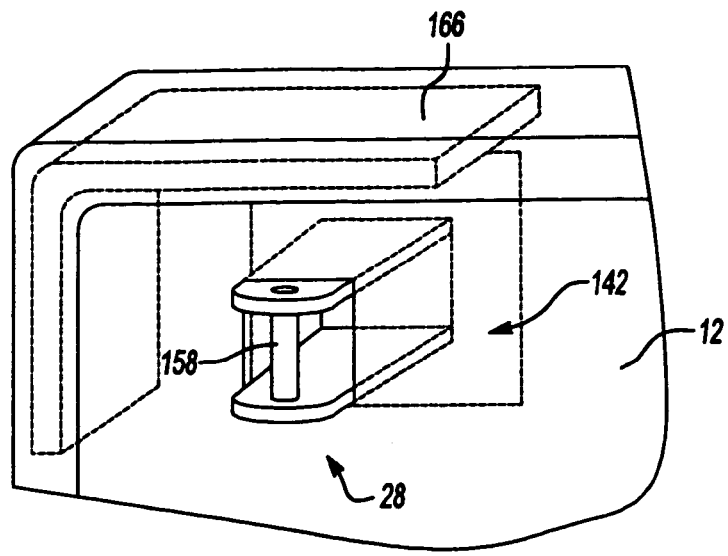
FIG. 12 illustrates a perspective view of another exemplary seat back structure.

It may be desirable to further reduce the potential for the retention mechanism to create a hinge point, by locally reinforcing the seat back in or adjacent the region to which the latch member is secured. This can be done in any suitable manner, for instance, by the incorporation of one or more integrated reinforcement structures in that region or by incorporation of an additional or supplemental metal, plastic or composite reinforcement member within the seat back, about the entirety or at least a portion of the perimeter of the seat back. For instance, FIG. 12 illustrates an L-shaped supplemental corner reinforcement 166, which is a relatively rigid member located between the opposing walls of the seat back. The supplemental reinforcement 166 can also be reoriented orthogonally about the z-axis relative to the position shown in FIG. 12. Of course, in such regions, integrated reinforcement structures may be employed as desired to achieve such reinforcement. Typically, if the striker bar 118 is located below about 20% of the height of the seat back, measured from the top of the seat back, then the supplemental reinforcement member is incorporated and positioned generally in the anticipated load path between a seat belt mounting point (if any) and the striker bar 118.

It will be appreciated that the use of a supplemental reinforcement member is not limited to the vicinity of the latch. One or more supplemental reinforcement members may be used elsewhere in the seat back. For instance, a hybrid seat back having a rigid supplemental reinforcement member may be placed between or outside of the seat back walls generally about the perimeter of the seat back.

Figure 13:
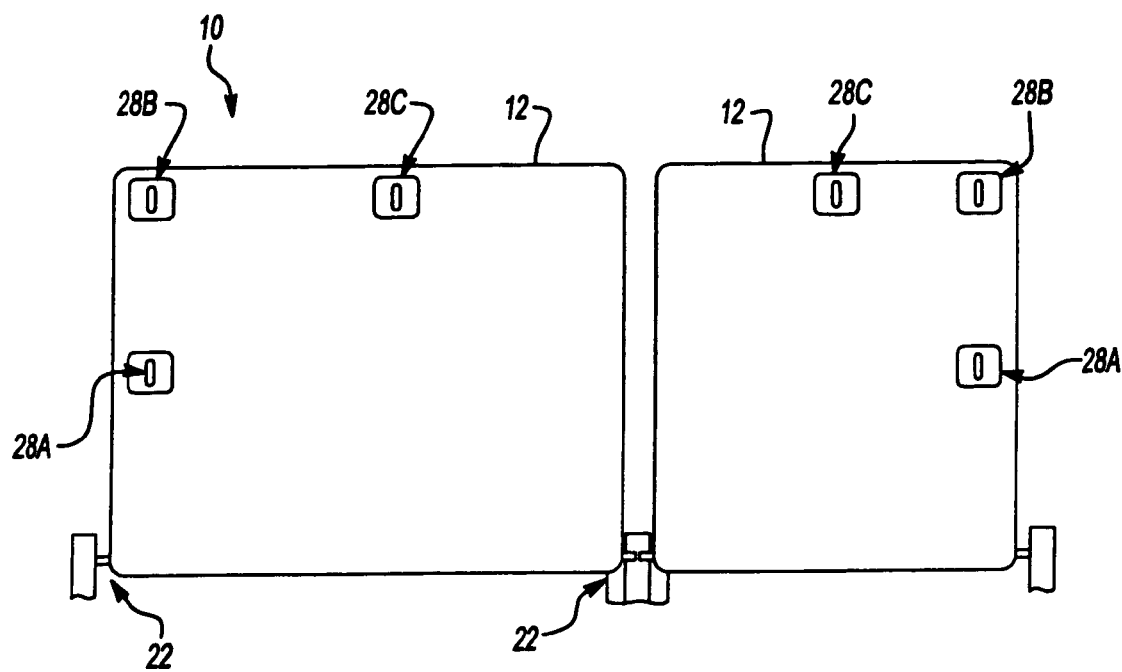
FIG. 13 is an elevation view of a seat back assembly.

With reference to FIG. 13 there is shown a typical split folding seat back assembly. The location of the retention mechanisms may be anywhere proximate the top or sides of the seat backs. Illustrated are alternative first, second and third respective locations 28A illustrating along a seat back side; 28B illustrating in one of the seat back corners; and 28C illustrating along the top of the seat back.

Referring to FIG. 14, a seatback configuration is illustrated with a pivotal mounting member. This configuration illustrates a seatback 12 with an extending pivot member 168. The extending pivot member 168 is configured such that the seatback 12 may be pivotally mounted to a bracket portion 120 thus negating the need for a cross bar 118.

As will be appreciated, proper material selection will permit efficient design and molding of optimal wall thicknesses, part section thicknesses or both, for achieving the desired performance without substantially increasing vehicle weight or intruding into interior space availability. By way of example, it is desired for many applications that the maximum wall stock thickness will range up to about 6 mm or higher, more preferably it will range from about 1 mm to about 4.0 mm, and still more preferably, it will range from about 2 mm to about 3 mm. Likewise, the maximum section thickness will range up to about 100 mm, more preferably it will range from about 10 mm to about 60 mm, and still more preferably it will range from about 20 to about 35 mm.

The materials selected for forming the walls of the seat backs of the present invention preferably exhibit an elastic modulus ranging from about 500 MPa to about 6000 Mpa, and more preferably about 1300 to about 3500 Mpa, and still more preferably about 1700 to about 2500 MPA. In applications when the seat back is also to be used as a load bearing floor, it is preferable to select a material toward the higher end of the ranges.

The preferred flexural modulus will be at least about 600 MPa, more preferably it will range from about 200 to about 500 ksi (1300 to about 3500 MPa), and still more preferably about 250 to about 350 ksi (1700 to about 2500 MPa).

The preferred yield strength of the material ranges from about 20 to about 200 Mpa. More preferably it will range from about 25 to about 70 MPa and still more preferably about 35 to about 55 Mpa. Moreover, the ductility (as measured by percent elongation) of the material preferably ranges from about 20% to about 150%, and more preferably it is at least about 30% and still more preferably, it is at least about 100%.

The material also will preferably exhibit attractive processing characteristics, such as a melt flow rate (230° C./3.8 kg-I; according to ASTM D1238) of about 0.300 to about 5.0 g/10 min to about 0.900 to about 3 g/10 min; a softening point (according to ASTM D1525) of less than about 180° C., and more preferably about 90° C. to about 150° C.; linear-flow mold shrink (according to ASTM D 955) of about 0.076 mm/mm (0.003 in/in) about 0.203 mm/mm (0.008 in/in) and more preferably about 0.152 mm/mm (0.006 in/in) to about 0.178 mm/mm (0.007 in/in); or a combination of these properties.

Accordingly, in one preferred embodiment, the seat back of the present invention preferably is made from a plastic material, and more preferably a thermoplastic material. In a particularly preferred embodiment, the seat back is made from a high strength thermoplastic resin selected from styrenics, polyamides, polyolefins, polycarbonates, polyesters or mixtures thereof. Still more preferably they are selected from the group consisting of acrylonitrile butadiene styrene, polycarbonate/acrylonitrile/butadiene styrene, polycarbonate, polyphenylene oxide/polystyrene, polybutylene terephthalate, polyphenylene oxide, polyphenylene ether, syndiotactic polystyrene, ethylene alpha olefin, polybutylene terephthalate/polycarbonate, polyamide (e.g., nylon), polyesters, polypropylene, polyethylene, and mixtures thereof.

Examples of preferred commercially available materials include PULSE® 2200 BG or 2000 EZ and MAGNUM® 1150 EM, both available from The Dow Chemical Company.

As indicated previously, another advantage of the present invention is that the first portion and the second portion may be either the same material or a different material. In this regard, either or both of the materials may be a thermoset or a thermoplastic material. Preferably, both materials are thermoplastics selected from the above-identified materials.

By way of particular example, without limitation, in one embodiment a seat back is fabricated having a first portion, that is to be forward facing upon installation in an automotive vehicle. The seat back also has a second portion that is to be rearward facing upon installation into the vehicle. The first portion is injection molded to include ribs, gussets or another type of integrated reinforcement structure. Preferably the first portion includes polycarbonate/acrylonitrile/butadiene styrene (e.g., PULSE® 2000 EZ from The Dow Chemical Company). The second portion is either injection molded, blow molded or thermoformed from an olefinic material, preferably a high density olefin, such as high density polyethylene (HDPE).

In another embodiment it is contemplated that a laminate or blend of at least two different plastic materials is provided for forming at least one of the portions. This may be accomplished in any of a number of different ways. For example, in one embodiment, a coextrusion of two or more different materials is provided and then it is subject to a further processing step, such as thermoforming.

In another embodiment, suitable for forming any of the components or assemblies of the present invention, a parison is provided for blow molding. The parison includes a first material at least partially encapsulated in a second material. Upon blow molding, adjoining layers of each of the materials are formed. Such a parison may be formed using any suitable art disclosed technique. One possible approach to such technique is illustrated in U.S. Pat. No. 5,968,431 (Issued Oct. 19, 1999; Ang et al.).

A parison is preferably extruded of one or more inner and outer layers of different plastics, e.g., recyclable plastics from the same family. During blow molding, the layers of the plastics will join at their respective interfaces. A support substrate can be formed from the inner layer(s), with a suitable show surface on the outermost layer. For example, the outermost layer may be a relatively soft or flexible material with a relatively rigid underlying layer. The characteristics of the outer and inner layers may be the same or different with respect to a wide range of properties including but not limited to strength, rigidity, tactile feel, porosity (e.g., one or both may foam to different densities), melting point, resistivity, conductivity, or otherwise.

While the technology of the present invention has been illustrated in connection with certain fabrication processes, it is not intended to be limited to such processes. Like results may be attainable using the teachings of the present invention in combination with other fabrication techniques, including but not limited to injection molding, lost core processing, rotoforming, compression molding (with or without decorative or structural inserts), thermoforming, or the like.

As will be appreciated from the above, preferred seating systems that are optimized in accordance with the criteria outlined herein, and using the referenced materials, consistently should pass United States and European government test standards for motor vehicles (e.g., as addressed in FMVSS 207, FMVSS 210, FMVSS 225 (49 CFR 571.207, .210, .225) or ECE 17; all such standards being expressly incorporated by reference herein) as well as the requirements of automobile original equipment manufacturers and their suppliers.

In one embodiment, the seating system (1) is capable of withstanding without rupture at least about 11000 Newtons in the direction in which the seat faces in a plane, parallel to the longitudinal centerline of the vehicle; (2) exhibits, upon rapid acceleration up to at least about 20 g, substantially no fragmentation of the seat back with at least a 30 kg mass placed behind the seat back; or (3) both (1) and (2).

More preferably, the seating system (1) is capable of withstanding without rupture at least about 13000 Newtons in the direction in which the seat faces in a plane, parallel to the longitudinal centerline of the vehicle; (2) exhibits, upon rapid acceleration of about 20 to about 30 g, substantially no fragmentation of the seat back with at least a 36 kg mass placed behind the seat back; or (3) both (1) and (2).

Though not intended to be limited thereby, in one embodiment, the seats, the anchorages, attachment hardware, and attachment bolts for the systems of the present invention are capable of withstanding without complete rupture at least a 3000 pound force and more preferably a 5,000 pound force. In one particularly preferred embodiment, the system is capable of withstanding a force of at least about 13,000 N to about 22,000 N generally in the direction in which the seat faces (to a pelvic body block)in a plane parallel to the longitudinal centerline of the vehicle, with an initial force application angle of not less than about 5 degrees or more than about 15 degrees above the horizontal. Still more preferably, the system withstands such force even when applied at an onset rate of not more than about 133,000 N per second to about 222,000 N per second, whereby the force is attained in not more than about 30 seconds and is maintained for about 10 seconds.

In yet another embodiment, each seat assembly is capable of withstanding (a) in any position to which the seat can be adjusted, a force (Newtons) of 20 times the mass of the seat in kilograms multiplied by 9.8 applied in a forward or rearward longitudinal direction; or (b) in its rearmost position, a force that produces a 373 Newton meters moment about the seating reference point for each designated seating position that the seat provides (as applied to an upper cross-member of the seat back or the upper seat back, in a rearward longitudinal direction for forward-facing seats).

In yet another highly preferred embodiment, the seatback of the present invention is incorporated into a seat assembly, and two 18 kg masses (e.g., cubes with an edge length of about 300 mm) are placed about 200 mm from the seat back. Upon rapid acceleration to at least about 20 to about 30 g, the seatback maintains the cargo disposed behind the seat back, with no visible fragmenting of the seat back or formation of sharp edges or corners.

Advantageously, in one additional preferred embodiment, the seat backs made in accordance with the present invention are capable of exhibiting a set less than 6 mm after soaking for about 4 hours at about 82° C. with an applied load of about 244 kg/m$^2$ and a momentary load of about 615 kg/m$^2$.

The stiffness, impact strength, and crack resistance of this seat back also will be greater than conventionally fabricated current blow molded polyethylene, filled polyethylene, polypropylene, or filled polypropylene seat backs.

The present invention contemplates techniques and methods for the optimization of one or more of material selection, wall thickness, section thickness, hinge design, and latch design, for realizing the desired stiffness and strength to meet traditionally demanding load requirements in automotive vehicles occasioned of center mounted shoulder belt loads, child seat anchor loads, or cargo intrusion. The skilled artisan will recognize, however, that from application to application, design requirements will vary, and therefore a reasonable amount of experimentation may be needed to adapt the various teachings to the unique intended environment. By way of example, part size, seat belt location, hinge points, latch locations, and split ratio may affect final design. It is believed that the use of conventional computer aided engineering (CAE) techniques in combination with the present teachings will yield satisfactory results, which can be improved as desired with conventional techniques for localized steel reinforcement (e.g., in high stress areas, such as hinge points, latch areas, seat belt mounting areas, and armrest support areas).

Thus, the present invention finds useful application in connection with any of a number of different types of seating systems, including but not limited to, adjustable seats, fixed position seats, foldable seats, seats pivotal about an axis, including but not limited to hinged seats. The seats may be vehicle rear seats, vehicle front seats, third row seats, jump seats or the like. As already indicated, in another particularly preferred embodiment, vehicle front seat backs are assembled in accordance with the above teachings. Moveable seats may be held in place by latches disposed in the central portion of the seating configuration (e.g., at the top), along the seat sides (anywhere from the top to the bottom), or elsewhere. Fixed seats may include no latch assembly nor any assembly. The seating system may include one or more rear seats that fold downward to a larger storage area, and which may require the seat back to act as load floor. The seat may be a split design (e.g., about 50/50, 60/40, 70/30 or the like), or the seats may constitute a one piece design. In one embodiment, the seat back is latched to either a structural package shelf (top latches) or to the body in white (side outboard latches), and seat belt anchors or seat belt guidance system (as may be needed for a center mounted belt) for the two outboard seats is not attached on the seat. (See FIG. 1).

A sliding lock pin might be incorporated between two folding seats. The sliding pin can be unlocked to fold down one portion of the seat and self locking when the seat backs are both upright. Localized reinforcement (e.g., steel reinforcement or plastic foam) for spreading loads may be incorporated into potential stress concentration locations, such as hinge points, latch areas, seat belt anchorage locations, child seat tether anchor locations, head rest attachments, armrest support areas, or the like.

In another embodiment, seat belt anchors or a seat belt guidance system for the center seat belt and/or child tether anchors are attached to the seat. Preferably, the top center seat belt mounting location is towards the middle of the seat back to help minimize the extent of cantilever, thereby helping to minimizing bending in response to a force.

Though it finds application in a variety of other environments (e.g., rail transportation seating, air transportation seating, amusement park rides, auditorium or stadium applications, or elsewhere), the present invention is particularly suitable for application in automotive vehicles of a number of different types, including but not limited to passenger cars (including sedans, coupes, station wagons, convertibles, or the like), multipurpose passenger vehicles (including sport utility vehicles, sport activity vehicles, minivans, or the like), trucks, and buses.

Systems of the present invention are not limited to seat backs, but may also include one or more additional components for a vehicle interior system, particularly a seating system, such as seat belts, and seat belt anchorage components for transferring seat belt loads to the vehicle structure, including, but not limited to, the attachment hardware, seat frames, seat pedestals, the vehicle structure itself, and other parts of the vehicle that help to prevent separation of the belt from the vehicle structure. The systems may optionally include supplemental inflatable restraint systems, such as air bags. Other seating system components that are contemplated as within the systems of the present invention include, without limitation, seat adjusters (power actuated and manual), lumbar supports, child seats, child seat tether anchors, wheels, integrated handles, telescoping, retractable or adjustable length handles, synthetic upholstery, natural upholstery (such as leather), seat warmers, seat coolers, headrests, integrated stereo components, arm rests, leg rests, cup holders, or the like. While in a preferred embodiment the seat belt incorporated into the system is a shoulder belt, and more preferably a three point harness, other seat belt types may also be used, such as lap belts only, lap belts with a separate or detachable torso belt.

As will be appreciated, the present invention also affords considerable design and manufacture flexibility, including but not limited to the ability to vary the configurations and contours of the respective opposing walls of a seat back. For instance, a first wall could be moldably configured to provide a suitable lumbar support. An opposing wall (i.e., the rearward facing wall when the seat back is in its upright position) could be configured to provide a relatively flat surface for carrying loads. Optionally, the opposing wall could be configured with suitable component housings or cargo carrying implements such as troughs, tie down members, tonneau cover brackets, seat belt retractor housings, or the like.

Figure 2D:
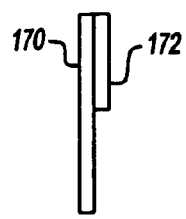
FIGS. 2D-2F are side sectional views to illustrate different panel portion assemblies.
Figure 2E:
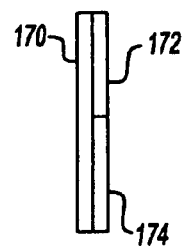
Figure 2F:
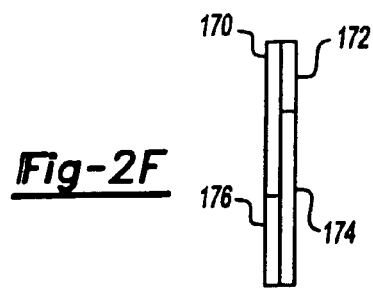
Figure 3A:
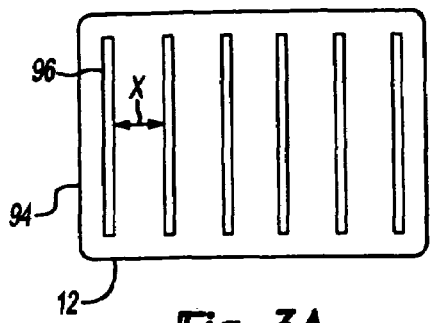
FIGS. 3A-I illustrates examples of alternative seatback integrated reinforcement structure components and patterns.
Figure 3B:
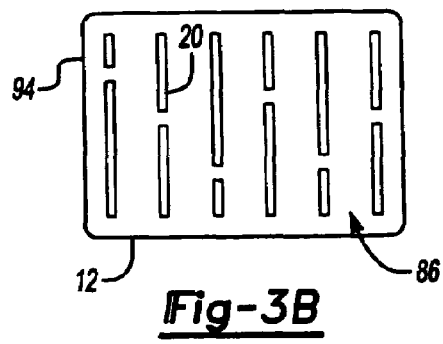
Figure 3C:
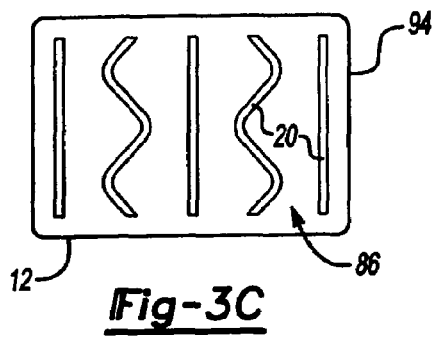
Figure 3D:
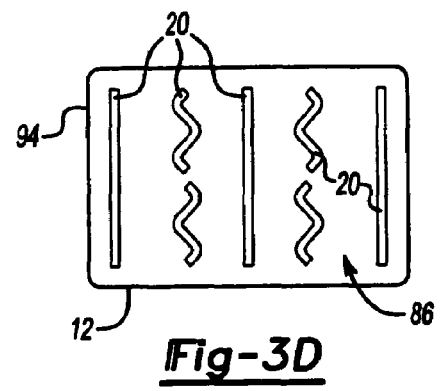
Figure 3E:
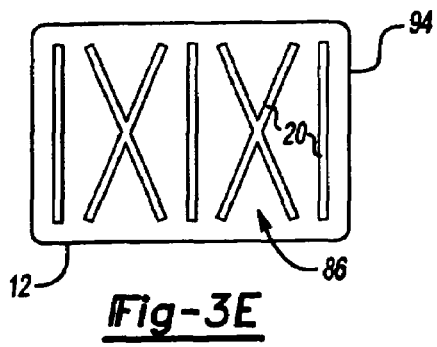
Figure 3F:
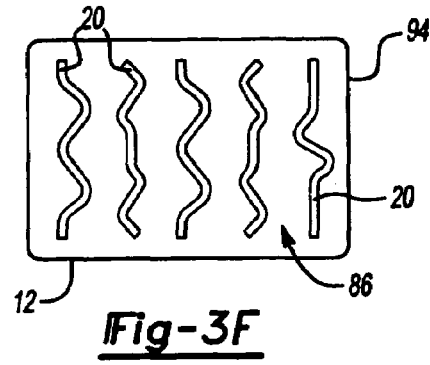
Figure 3G:
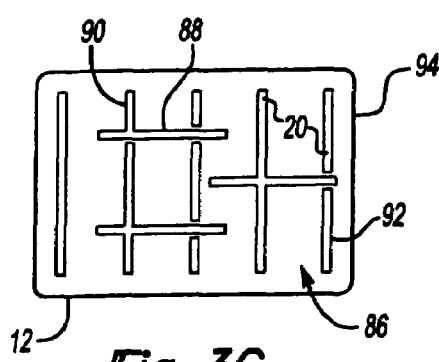
Figure 3H:
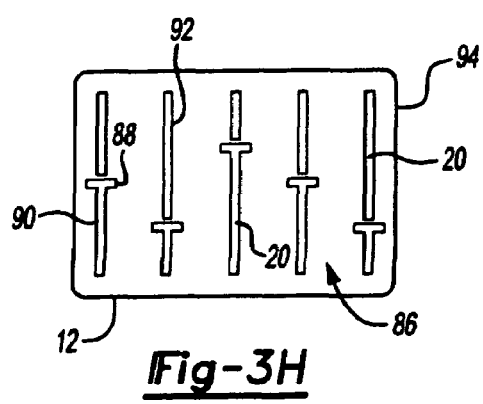
Figure 3I:
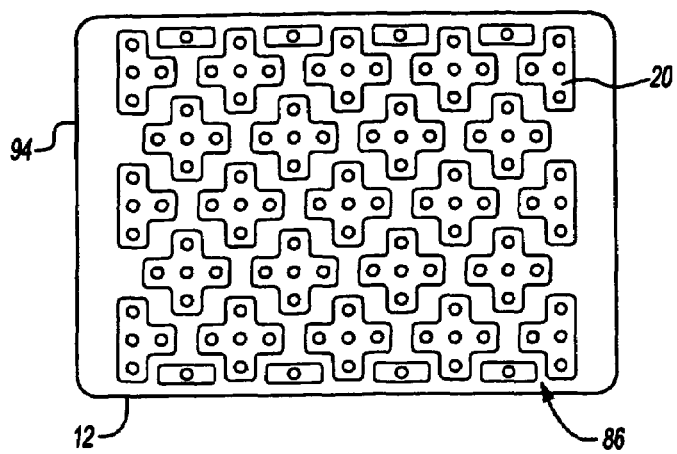

It will be appreciated that one preferred embodiment of the present invention has focused upon panels that oppose each other over substantially their entire faces. However, the invention is not limited thereto. A seen in FIG. 2D, it is possible that a panel portion 170 only spans over a portion of an opposing panel portion 172. A single panel portion 170 may oppose plural panel portions 172, 174, as shown in FIG. 2E. Plural panel portions 170, 176 may oppose plural panel portions 172, 174, as shown in FIG. 2F. Other variations are also possible.

It will also be appreciated that the present invention need not be limited to seat backs. The teachings may be extended also to the seat base portions of seating assemblies. In this regard, it may also be possible for the seat base and the seat back to be assembled onto a common frame. The frame may be assembled to the the seat back before or after assembly to the seat base. The frame may include or carry any of a number of different features that are typically incorporated into seat assemblies, including motors, heaters, supports, cushions, or the like.

Figure 18:
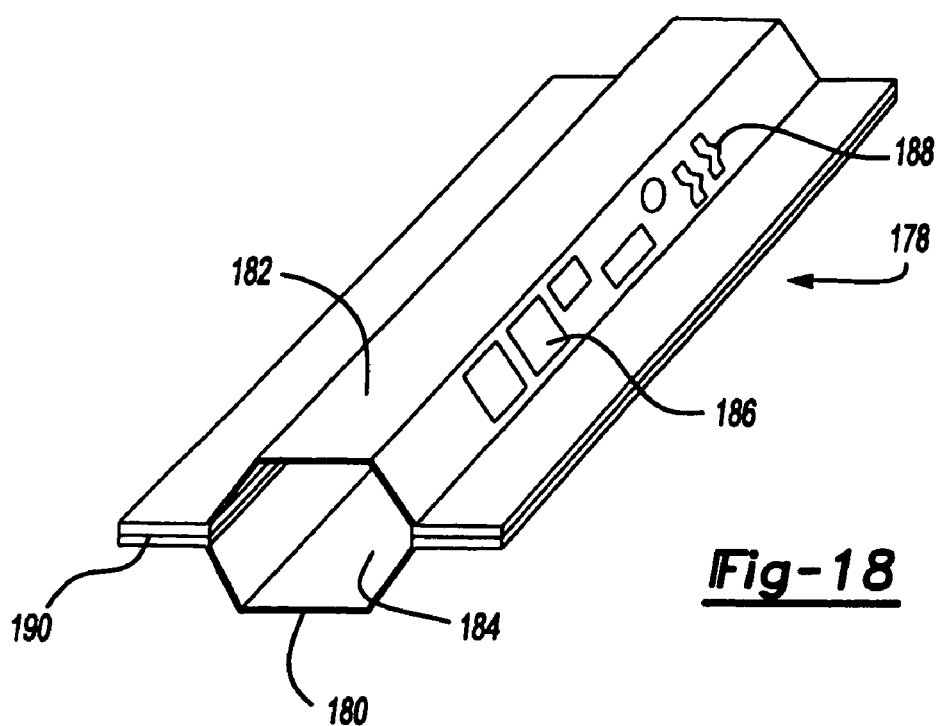
FIG. 18 is a perspective view of an instrument panel in accordance with the present invention.

In another embodiment, shown in FIG. 18, the concepts of the present invention are applied for manufacturing an instrument panel 178. The instrument panel includes at least one and preferably two opposing molded (e.g., blow molded, injection molded, or the like) cross vehicle structures, which are shown as panels 180, 182, and which may be the same or different material, and preferably is plastic. Preferably the panels are joined (e.g., using a fastener, an adhesive or a welding technique as discussed in the foregoing). At least one hollow passageway 184 is defined between the panels, which preferably is suitable for functioning as an air duct for a vehicle cabin heating and cooling system. The panels preferably are configured with suitable openings 186 or molded attachment structures 188 adapted for receiving one or more instruments, gauges, or other components, or communicating air to a vent opening into the passenger compartment. A joint (e.g., an adhesive joint, weld joint, mechanical joint or the like) joins the panels, such as along flanges 190. Flanges 190 may extend along one or both of the panels 180, 182, on one or both sides of the same.

Figure 19:
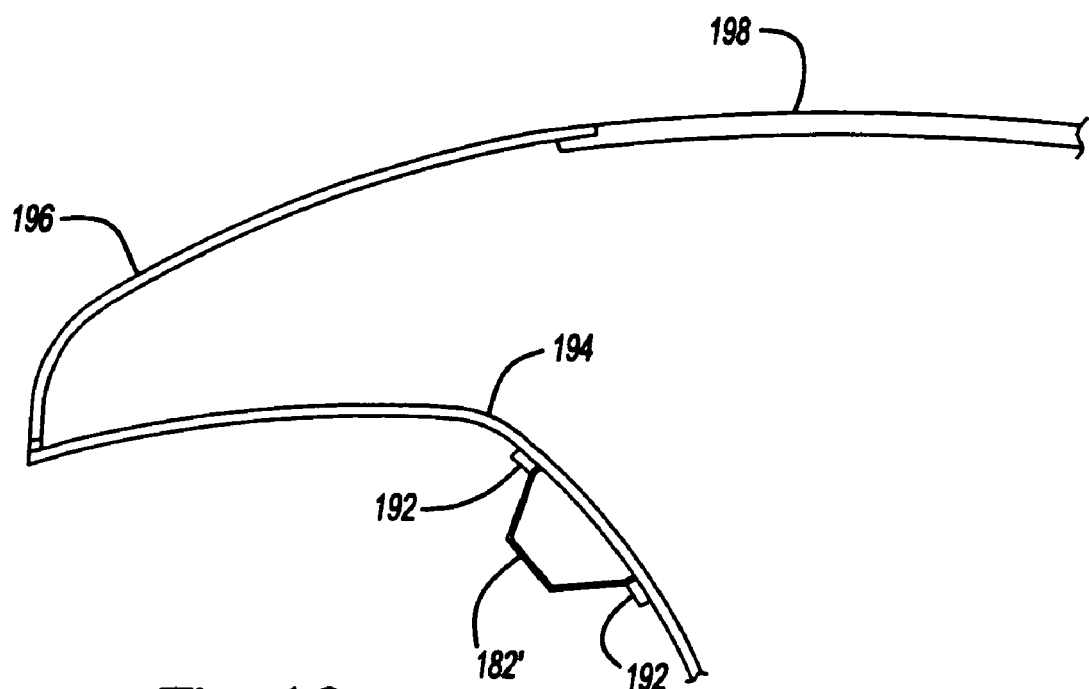
FIG. 19 is a side sectional view of another instrument panel assembly.

In one embodiment, the opposing panels are generally symmetrical relative to each other, such as shown in FIG. 18. However, this need not be the case in all instances. For example, in one embodiment shown in FIG. 19, one panel 182' is joined at a joint 192 to a dashboard 194. The dashboard 194, in turn adjoins a windshield 196 mounted to a vehicle body structure 198.

For this embodiment, as well as the other embodiments disclosed herein, advantageously a show surface (e.g., a surface exposed to view in or on the vehicle) may be fabricated from a molded-in-color thermoplastic polyolefin (e.g., a molded in color thermoplastic polyolefin outer surface) joined to an underlying component for imparting strength and rigidity to the resulting assembly. For example, a molded-in-color thermoplastic polyolefin outer panel might be joined to a polycabonate acrylonitrile butadiene styrene support structure. The above teachings of coextruded parisons may also be suitably employed for blow molding instrument panels.

The technology of the present invention may also be applied in providing partial or entire vehicle interior systems, including but not limited to headliners, vehicle doors, glove compartments, knee bolsters, and the like. In this regard, it may be possible to attach two or more components to each other (whether the same material or not) using one of the presently described adhesives.

In another embodiment, the seating system of the present invention, the seating system of commonly-owned and co-pending U.S. application Ser. No. 09/766,792 (filed Jan. 22, 2001; incorporated by reference herein), or both are upholstered with:

1) a suitable fabric cover, leather or suede cover, simulated leather or suede cover, or a combination thereof;

2) a carpet or other floor covering; or 3) a combination thereof.

In one embodiment, a hook and loop fastening system is applied to the seat back for attaching the upholstery. In another embodiment, upholstery is attached and then a cushion material (e.g., a foam) is inserted between the upholstery and the seat back. Alternatively, the cushion material may be foamed in place. Art-disclosed rim trimming techniques, envelope trimming techniques or a combination thereof may also be employed. Of course, as discussed in the above, art-disclosed insert molding techniques may be applied as well.

Another advantage of the present invention is that it lends itself well to the ability to provide seat assemblies that can be recycled. Accordingly, in another aspect of the present invention, after the product life has concluded the products of the present invention are recycled using art-disclosed recycling techniques. In this regard, in one preferred embodiment, the plastics that are employed to fabricate a component are from the same plastic family for recycling purposes. Of course, in another embodiment, they may be from different families.

Figure 20:
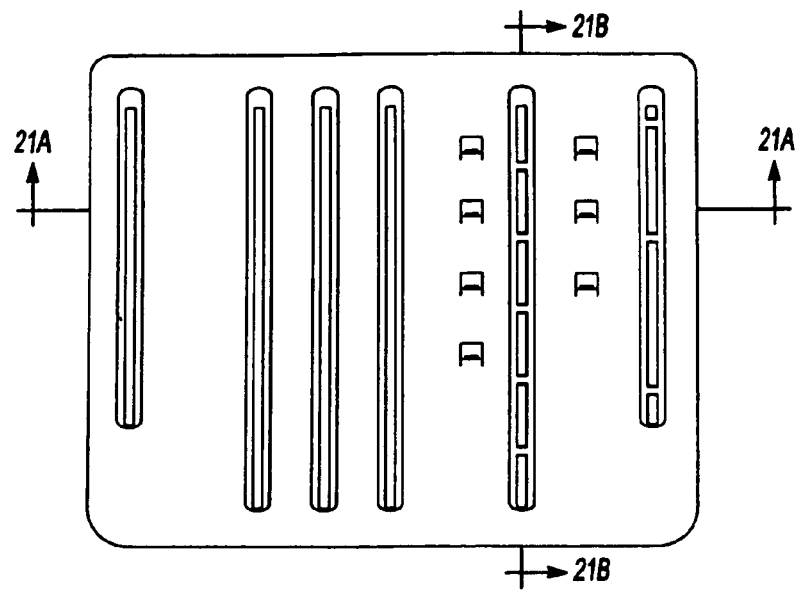
FIG. 20 is a plan view illustration of one illustrative structure for a seat back.
Figure 21A:
FIG. 21A is a sectional view through line A-A of FIG. 20.
Figure 21B:
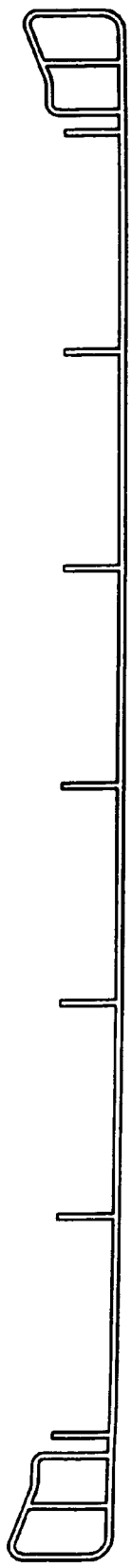
FIG. 21B is a sectional view through line B-B of FIG. 20.

FIG. 20 is a plan view illustration of one illustrative structure for a seat back. FIG. 21A is a sectional view through line 21 A-A of FIG. 20, to illustrate the section profile. FIG. 21B is a sectional view through line 21 B-B of FIG. 20, also illustrating a section profile. Preferably a forward panel portion is made separate from a rearward panel portion and the two panels are joined at a joint in accordance with the teachings herein. As seen, an example of a preferred integrated reinforcement pattern preferably includes one or a combination of a plurality of elongated integrated reinforcement structures, a plurality if integrated reinforcement structures having a length that is approximately the same as the width of each structure, or at least one elongated integrated reinforcement structure having a plurality of longitudinally spaced transverse ribs.

Figure 22:
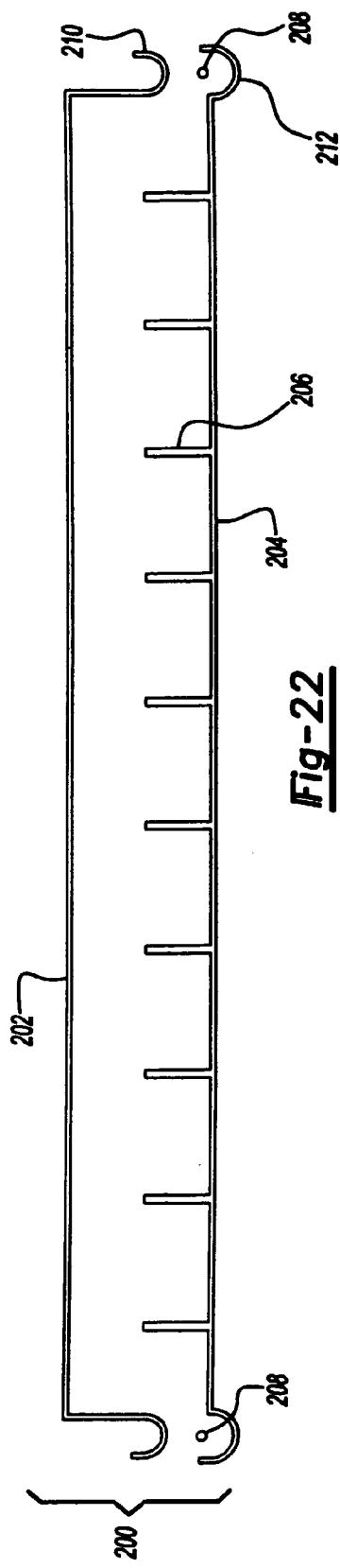
FIG. 22 is a side view showing an alternative approach to forming a joint.

FIG. 22 is a side view showing an alternative approach to forming a joint for a seat back 200 having a first panel 202 and a second panel 204. The second panel is shown with ribs 206 or another suitable integrated reinforcement structure (although the first panel may also have a suitable integrated reinforcement structure). A joint is formed by bringing together, with an intermediate adhesive 208, opposing flanges (e.g., first and second arcuate flanges 210 and 212), and placing an adhesive therebetween, with or without a suitable surface treatment, such as a primer coating, plasma treatment or the like. The flanges are shown as arcuate, but may be other shapes as well or possibly flat.

Figure 23:
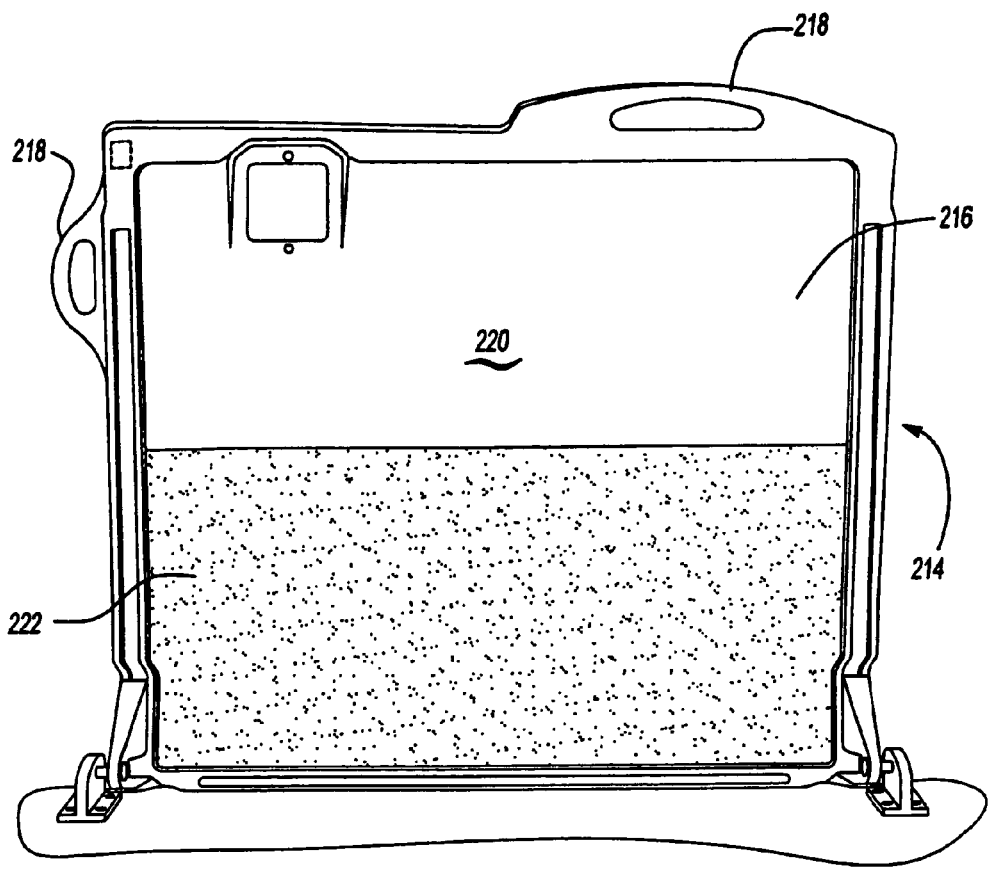
FIG. 23 is a view of another embodiment to illustrate a reinforcement panel.

Referring to FIG. 23, there is shown another type of seat back assembly 214. In the assembly 214, a seat back 216 optionally includes one or more grab handles 218 (separately attached or integrally formed therewith). They can be located as shown along an edge of the seat back, or elsewhere, such as on a forward or rear wall portion 220 of the seat back 216.

Also shown in FIG. 23 is one illustrative location for an external reinforcement panel 222 that is laminated or otherwise attached over some or all of a wall portion 220 of the seat back 216. The reinforcement panel 222 may be a metal or plastic layer (e.g., a film, such as an adhesive backed film); it may be a natural material (e.g. leather or suede); it may be a woven or unwoven fabric (e.g., from a fibrous plastic or glass material); it may be a carpet; or it may be some other suitable structure for at least partially covering or encapsulating the seat back 216. The panel need not be capable of supporting its own weight, though in one embodiment it is. Preferably the reinforcement panel is suitable for containing or restraining any fractured seat back components in the event of seat back failure, or for otherwise locally imparting strength or toughness to the assembly. The reinforcement panel is shown in FIG. 23 as extending across the width of a seat back, over only a portion of the vertical height of the seat back. It can extend the full height or width of the seat back or both. It may also extend only a portion of the height, or a portion of the height and a portion of the width of the seat back. It may fold over from a front wall portion to a rear wall portion. The reinforcement panel may be secured to the seat back in any suitable manner, such as by adhesive, by insert molding, or otherwise. If the reinforcement panel is plastic, the panel may be thermoset or thermoplastic or a combination thereof. Examples of materials include, without limitation, high molecular weight polyolefin, polyester, polyethylene terephthalate, epoxy/polyester blend, vinyl, or the like. The panel may include an elastomeric component. The panel may comprise one or a plurality of continuous or discontinuous layers of material. It may be paintable. It may have a surface topography that is continuous or variable. The surface may have a texture that is formed or intrinsic in the material itself.

Figure 24:
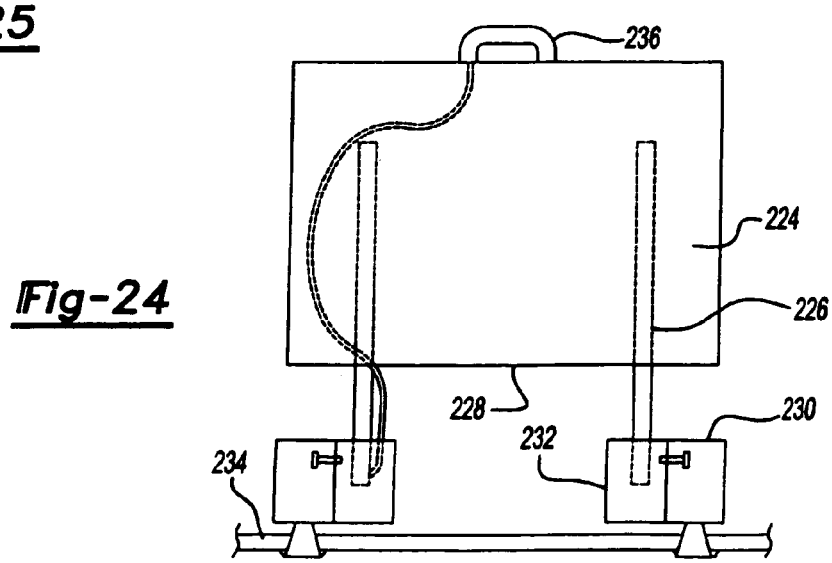
FIG. 24 is a view of another embodiment to illustrate an alternative attachment assembly.

As shown in FIG. 24, there is shown another approach to attaching a seat back to the vehicle. In this approach, a seat back 224 has one or more posts 226 that project from a bottom portion 228 of the seat back. The posts are removably or permanently received in a mounting bracket 230, which optionally has a pivotally displaceable portion 232 for allowing the bracket to also function as a hinge. The mounting bracket, in turn, is secured to the vehicle body in white 234, such as with a suitable fastener, weld, or otherwise. In another embodiment, the posts penetrate the body-in-white, such as with a bracket mounted to the body in white. In one optional embodiment, a suitable grab handle 236 may be employed along a side or top of the seat back or elsewhere. A suitable remote actuator mechanism may be incorporated into to handle or placed elsewhere for connecting or disconnecting the posts to their respective brackets. For example, the actuator might be attached to the handle and have a cable (shown in phantom) or other suitable member for moving a ratchet or other securing mechanism into and out of engagement as between the bracket and the posts. In this manner, a seat back might be removed from a vehicle without the need to remove an entire seat.

Figure 25:
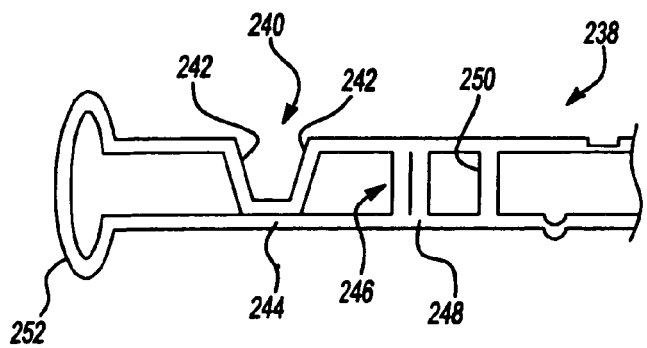
FIG. 25 is a section of an illustrative blow molded seat back.

The above should be understandable to the person skilled in the art, as will the application of the novel concepts herein for use in a blow molded seat back. As indicated, examples of various blow molded structures are depicted in co-pending U.S. application Ser. No. 09/766,792 (filed Jan. 22, 2001), hereby incorporated by reference. By way of illustration, a section of a blow molded seat back 238 illustrating different reinforcing structures is shown in FIG. 25. One such configuration includes a tack-off 240, having a plurality of walls 242 (shown optionally in contact with the wall 244) that are spaced apart to effectively define a beam structure. Another illustrative configuration includes a tack-off 246 having a plurality of adjoining walls 248 in contact with each other; yet another illustrative configuration includes a single wall rib 250, which can be formed, for instance, by employing one or a plurality of movable inserts in the tooling during forming. Still another configuration may include an enlarged rib 252 (i.e. having an enlarged portion on one or more of its sides) or some other like configuration. Another configuration includes a wall portion that has a different wall thickness relative to an adjoining wall portion.

In another embodiment, it is possible to vary the materials used for the seat backs across the width of the seating assembly in a vehicle. For example, for a split seat arrangement (e.g. 60/40) one seat back may be one material, and the other a different material. For example, one seat back is made of PC/ABS and the other one is HDPE.

The skilled artisan will recognize that although the seating system of the present invention has been described in relation to automotive seating, the system may also be used for other seats such as airplane and bus seats or auditorium and stadium seats.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims. In particular regard to the various functions performed by the above described components, assemblies, devices, compositions, etc., the terms used to describe such items are intended to correspond, unless otherwise indicated, to any item that performs the specified function of the described item, even though not necessarily structurally equivalent to the disclosed structure. In addition, while a particular feature of the invention may have been described above with respect to only one of the embodiments, such feature may be combined with one or more other features of other illustrated embodiments.

What is claimed is:

1. A method of forming an instrument panel assembly for an automotive vehicle, comprising:

providing a first cross-vehicle structure configured for extending in a cross-vehicle direction relative to the vehicle, the first structure being formed of a first material wherein the first material is a plastic and wherein the first structure includes a flange extending along a side of the first structure and forming a distal edge extending in the cross-vehicle directions;

providing a second cross-vehicle structure also configured for extending in the cross-vehicle directions, the second cross-vehicle structure being formed of a second material wherein the second material is a plastic and wherein the second structure includes a flange extending along a side of the second structure and forming a distal edge extending in the cross-vehicle directions;

joining the first structure to the second structure including vibration or ultrasonic welding the flange of the first structure to the flange of the second structure such that the distal edges of the first and second structures cooperatively form a distal edge of instrument panel assembly;

wherein the first and second cross-vehicle structures cooperatively form an HVAC duct of the instrument panel assembly; wherein the flange of the first structure and the flange of the second structure extend cross-vehicle and extend along a substantial portion of the sides of the first and second structures; and wherein the flange of the first structure and the flange of the second structure extend away from the duct.

2. A method as in claim 1 wherein the step of joining the first structure to the second structure additionally includes fastening the first structure to the second structure with a mechanical fastener.

3. A method as in claim 1 wherein the first cross-vehicle structure, the second cross vehicle structure or both at least partially form one or more openings for fluid communication to a cabin of the automotive vehicle.

4. A method as in claim 1 wherein the step of providing the first structure includes at least one of injection molding, compression molding or blow molding the structure to the desired shape.

5. A method as in claim 1 wherein the step of providing the second structure includes at least one of injection molding, compression molding or blow molding the structure to the desired shape.

6. A method as in claim 1 wherein the first and second structures are panels.

7. A method as in claim 1 wherein at least one of the first and second structures is joined to a dashboard and, wherein the dashboard adjoins a windshield mounted to a body structure of the automotive vehicle.

8. A method as in claim 1 wherein the first material and the second material includes at least one of a styrenic, a polyamide, a polyolefin, a polycarbonate, a polyester or mixtures thereof.

9. A method as in claim 1 wherein the first cross-vehicle structure and second structure are adapted to be joined to a separate show surface of the vehicle.

10. A method as in claim 9 wherein one or both of the first panel and the second panel include an opening for receiving an instrument or a gauge.

11. A method as in claim 10 wherein the show surface is formed of a molded-in-color thermoplastic polyolefin.

12. A method as in claim 1 wherein one or both of the first panel and the second panel include an opening for receiving a gauge.

13. A method as in claim 1 wherein the step of joining the first structure to the second structure additionally includes fastening the first structure to the second structure with a mechanical fastener.

14. A method as in claim 1 wherein the step of providing the first structure includes at least one of injection molding, compression molding or blow molding the structure to the desired shape and, wherein the step of providing the second structure includes at least one of injection molding, compression molding or blow molding the structure to the desired shape.

15. A method as in claim 9 wherein the show surface adjoins a windshield mounted to a body structure of the automotive vehicle.

16. A method as in claim 1 wherein the first structure is generally symmetrical relative to the second structure.

17. A method as in claim 1 wherein the first structure and the second structure are formed by compression molding.

18. A method as in claim 1 wherein the first structure and the second structure are formed by injection molding.

19. A method as in claim 1 wherein the flange of the first structure is vibration welded to the flange of the second structure.

20. A method as in claim 1 wherein the flange of the first structure is ultrasonically welded to the flange of the second structure.

21. A method as in claim 1 wherein the flange of the first structure and the flange of the second structure extend continuously cross-vehicle.

* * * * *